(12) United States Patent
Halas et al.

(10) Patent No.: US 9,032,731 B2
(45) Date of Patent: May 19, 2015

(54) COOLING SYSTEMS AND HYBRID A/C SYSTEMS USING AN ELECTROMAGNETIC RADIATION-ABSORBING COMPLEX

(75) Inventors: Nancy J. Halas, Houston, TX (US); Peter Nordlander, Houston, TX (US); Oara Neumann, Houston, TX (US)

(73) Assignee: William Marsh Rice University, Houston, TX (US)

( * ) Notice: Subject to any disclaimer, the term of this patent is extended or adjusted under 35 U.S.C. 154(b) by 338 days.

(21) Appl. No.: 13/326,521

(22) Filed: Dec. 15, 2011

(65) Prior Publication Data
US 2012/0153621 A1   Jun. 21, 2012

Related U.S. Application Data

(60) Provisional application No. 61/423,438, filed on Dec. 15, 2010.

(51) Int. Cl.
*F03G 6/00* (2006.01)
*B60K 16/00* (2006.01)
*F03G 6/06* (2006.01)

(52) U.S. Cl.
CPC *F03G 6/065* (2013.01); *Y02E 10/46* (2013.01)

(58) Field of Classification Search
CPC ............ F03G 6/00; F03G 6/003; F03G 6/06; F03G 6/065; Y02E 10/40; Y02E 10/46
USPC .................................... 60/641.8–641.15, 670
See application file for complete search history.

(56) References Cited

U.S. PATENT DOCUMENTS

| | | | |
|---|---|---|---|
| 4,320,663 A | 3/1982 | Francia | |
| 4,391,100 A | 7/1983 | Smith | |
| 4,876,854 A * | 10/1989 | Owens | 60/641.8 |
| 5,241,824 A | 9/1993 | Parker et al. | |
| 5,419,135 A * | 5/1995 | Wiggs | 60/641.15 |
| 6,685,986 B2 | 2/2004 | Oldenburg et al. | |
| 7,247,953 B1 | 7/2007 | Schmulewitz | |
| 2003/0107741 A1 | 6/2003 | Pyo et al. | |
| 2005/0269316 A1 | 12/2005 | Monteleone et al. | |

(Continued)

FOREIGN PATENT DOCUMENTS

| | | |
|---|---|---|
| EP | 2123968 A1 | 11/2009 |
| GB | 2456765 A | 7/2009 |
| WO | 93/00781 A1 | 1/1993 |
| WO | 99/06322 A1 | 2/1999 |
| WO | 2008/104900 A2 | 9/2008 |
| WO | 2009/114567 A1 | 9/2009 |

OTHER PUBLICATIONS

Written Opinion of the International Searching Authority for International Application No. PCT/US2011/062507 mailed Mar. 6, 2012 (7 pages).

(Continued)

*Primary Examiner* — Hoang Nguyen
(74) *Attorney, Agent, or Firm* — Osha Liang LLP

(57) ABSTRACT

A method for powering a cooling unit. The method including applying electromagnetic (EM) radiation to a complex, where the complex absorbs the EM radiation to generate heat, transforming, using the heat generated by the complex, a fluid to vapor, and sending the vapor from the vessel to a turbine coupled to a generator by a shaft, where the vapor causes the turbine to rotate, which turns the shaft and causes the generator to generate the electric power, wherein the electric powers supplements the power needed to power the cooling unit.

15 Claims, 17 Drawing Sheets

(56) References Cited

U.S. PATENT DOCUMENTS

| | | | |
|---|---|---|---|
| 2008/0241262 A1 | 10/2008 | Lee et al. | |
| 2008/0308403 A1 | 12/2008 | Maloney et al. | |
| 2008/0318031 A1 | 12/2008 | Smith | |
| 2009/0179429 A1* | 7/2009 | Ellis et al. | 290/1 R |
| 2011/0180385 A1 | 7/2011 | Imholt | |
| 2011/0185728 A1* | 8/2011 | Meyers et al. | 60/641.11 |
| 2011/0226440 A1* | 9/2011 | Bissell et al. | 165/10 |
| 2011/0240104 A1 | 10/2011 | Lee et al. | |

OTHER PUBLICATIONS

Written Opinion of the International Searching Authority for International Application No. PCT/US2011/062497 mailed Mar. 6, 2012 (7 pages).

Written Opinion of the International Searching Authority for International Application No. PCT/US2010/060477 mailed Mar. 2, 2012 (9 pages).

International Report on Patentability issued in PCT/US2011/062497 mailed Jun. 18, 2013 (9 pages).

International Report on Patentability issued in PCT/US2011/062507 mailed Jun. 18, 2013 (9 pages).

Taylor, R., Phelan, P., Otanicar, T., Adrian, R., and Prasher, R; "Vapor Generation in a Nanoparticle Liquid Suspension Using a Focused, Continuous Laser," Applied Physics Letters, AIP, American Institute of Physics, vol. 95, No. 16, Oct. 21, 2009 (3 pages).

International Search Report for PCT/US2010/060477 mailed Mar. 2, 2012 (3 pages).

International Search Report for PCT/US2011/062507 mailed Mar. 6, 2012 (3 pages).

International Search Report for PCT/US2011/062497 mailed Mar. 6, 2012 (3 pages).

Office Action issued in related U.S. Appl. No. 13/884,552 dated Dec. 18, 2014 (16 pages).

* cited by examiner

COOLING SYSTEMS AND HYBRID A/C SYSTEMS USING AN ELECTROMAGNETIC RADIATION-ABSORBING COMPLEX

CROSS REFERENCE TO RELATED APPLICATIONS

This application claims priority under 35 U.S.C. §119(e) to U.S. Provisional Patent Application Ser. No. 61/423,438, which is incorporated by reference in its entirety.

STATEMENT REGARDING FEDERALLY SPONSORED RESEARCH OR DEVELOPMENT

The invention was made with government support under Grant Number DE-AC52-06NA25396 awarded by the Department of Energy. The government has certain rights in the invention.

BACKGROUND

The generation of electricity generally involves harnessing energy and using that energy to operate a generator. At times, the energy used to operate the generator is created using a combustion process. For example, natural gas, coal, fuel oil, certain types of biomass, or some other suitable fuel may be combusted to generate heat. The combustion of the fuel may occur in a boiler, where the resulting heat is combined with fluid (commonly water) to generate vapor (commonly steam). Once the vapor reaches a certain temperature, the vapor may be channeled through a turbine coupled to the generator. Air conditioners and cooling systems run on electricity and are known to strain the electricity supply during peak hours.

SUMMARY

In general, in one aspect, the invention relates to a method for powering a cooling unit, the method comprising applying electromagnetic (EM) radiation to a complex, wherein the complex absorbs the EM radiation to generate heat, wherein the complex is at least one selected from a group consisting of copper nanoparticles, copper oxide nanoparticles, nanoshells, nanorods, carbon nanostructures, encapsulated nanoshells, encapsulated nanoparticles, and branched nanostructures, transforming, using the heat generated by the complex, a fluid to vapor, and sending the vapor from the vessel to a turbine coupled to a generator by a shaft, wherein the vapor causes the turbine to rotate, which turns the shaft and causes the generator to generate the electric power, wherein the electric powers supplements the power needed to power the cooling unit.

In general, in one aspect, the invention relates to a system, the system comprising a pump configured to extract fluid from a fluid source, a turbine coupled to a generator by a shaft, and a vessel comprising a complex, wherein the vessel is configured to receive the fluid fed by the pump, concentrate electromagnetic (EM) radiation received from an EM radiation source, apply the EM radiation to the complex, wherein the complex absorbs the EM radiation to generate heat, transform, using the heat generated by the complex, the fluid to vapor, and send the vapor to the turbine, wherein the vapor rotates the turbine and, using the shaft, causes the generator to generate the electric power, wherein the electric power supplements the power needed to power the cooling unit, the cooling unit configured to cool a structure, wherein the cooling unit obtains power from the turbine and from one selected from a group consisting of a direct current (DC) power source and an alternating current (AC) power source.

Other aspects of the invention will be apparent from the following description and the appended claims.

DETAILED DESCRIPTION

Figure 1:
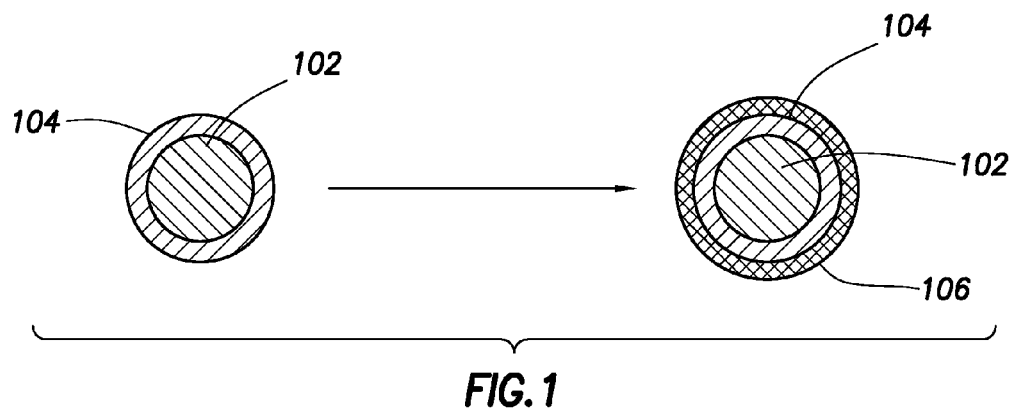
FIG. 1 shows a schematic of a complex in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for generating electric power using an electromagnetic (EM) radiation-absorbing complex. More specifically, one or more embodiments of the invention provide for creating a vapor (e.g., steam) from a fluid (e.g., water) by heating the fluid using one or more complexes (e.g., nanoshells) that have absorbed EM radiation to power or contribute to the power necessary to operate a cooling system.

The invention may provide for a complex mixed in a liquid solution, used to coat a wall of a vessel, integrated with a material of which a vessel is made, and/or otherwise suitably integrated with a vessel used to apply EM radiation to the complex. All the piping and associated fittings, pumps, valves, gauges, and other equipment described, used, or contemplated herein, either actually or as one of ordinary skill in the art would conceive, are made of materials resistant to the heat and/or chemicals transported, transformed, pressurized, created, or otherwise handled within those materials.

In one or more embodiments of the invention, a power generation system may be used to power or help supplement the power a cooling system. The power generation system may be incorporated into the manufacturing of the cooling system or may connected to existing cooling systems. In one or more of the embodiments, the power generation system may be connected to an existing cooling system through the power supply connection of the cooling system. In such an embodiment, the supplemental power generation of the invention may be connected in series with the power supply of the established cooling system.

In one or more embodiments, the power supply generating section may supply power to a cooling system, or supplement the power to a cooling system, based on specific conditions. For example, the power supply generation may be instigated based on outdoor temperature, specific time of day, power availability, and/or the availability of EM radiation. In another example, power supply generating section includes a photocell and the power from the turbine is provided to the cooling unit based on a reading of the photocell.

A source of EM radiation may be any source capable of emitting energy at one or more wavelengths. For example, EM radiation may be any source that emits radiation in the ultraviolet, visible, and infrared regions of the electromagnetic spectrum. A source of EM radiation may be manmade or occur naturally. Examples of a source of EM radiation may include, but are not limited to, the sun, waste heat from an industrial process, and a light bulb. One or more concentrators may be used to intensify and/or concentrate the energy emitted by a source of EM radiation. Examples of a concentrator include, but are not limited to, lens(es), a parabolic trough(s), mirror(s), black paint, or any combination thereof.

In one or more embodiments, the complex may include one or more nanoparticle structures including, but not limited to, nanoshells, coated nanoshells, metal colloids, nanorods, branched or coral structures, and/or carbon moieties. In one or more embodiments of the invention, carbon moieties include carbon nanostructures, including but not limited to carbon nanotubes, carbon film, or C-60 molecules. In one or more embodiments, the complex may include a mixture of nanoparticle structures to absorb EM radiation. Specifically, the complex may be designed to maximize the absorption of the electromagnetic radiation emitted from the sun. Further, each complex may absorb EM radiation over a specific range of wavelengths.

In one or more embodiments, the complex may include metal nanoshells. A nanoshell is a substantially spherical dielectric core surrounded by a thin metallic shell. The plasmon resonance of a nanoshell may be determined by the size of the core relative to the thickness of the metallic shell. Nanoshells may be fabricated according to U.S. Pat. No. 6,685,986, hereby incorporated by reference in its entirety. The relative size of the dielectric core and metallic shell, as well as the optical properties of the core, shell, and medium, determines the plasmon resonance of a nanoshell. Accordingly, the overall size of the nanoshell is dependent on the absorption wavelength desired. Metal nanoshells may be designed to absorb or scatter light throughout the visible and infrared regions of the electromagnetic spectrum. For example, a plasmon resonance in the near infrared region of the spectrum (700 nm-900 nm) may have a substantially spherical silica core having a diameter between 90 nm-175 nm and a gold metallic layer between 4 nm-35 nm.

A complex may also include other core-shell structures, for example, a metallic core with one or more dielectric and/or metallic layers using the same or different metals. For example, a complex may include a gold or silver nanoparticle, spherical or rod-like, coated with a dielectric layer and further coated with another gold or silver layer. A complex may also include other core-shell structures, for example hollow metallic shell nanoparticles and/or multi-layer shells.

In one or more embodiments, a complex may include a nanoshell encapsulated with a dielectric or rare earth element oxide. For example, gold nanoshells may be coated with an additional shell layer made from silica, titanium or europium oxide.

In one embodiment of the invention, the complexes may be aggregated or otherwise combined to create aggregates. In such cases, the resulting aggregates may include complexes of the same type or complexes of different types.

In one embodiment of the invention, complexes of different types may be combined as aggregates, in solution, or embedded on substrate. By combining various types of complexes, a broad range of the EM spectrum may be absorbed.

FIG. 1 is a schematic of a nanoshell coated with an additional rare earth element oxide in accordance with one or more embodiments of the invention. Typically, a gold nanoshell has a silica core 102 surrounded by a thin gold layer 104. As stated previously, the size of the gold layer is relative to the size of the core determines and the plasmon resonance of the particle. According to one or more embodiments of the invention, a nanoshell may then be coated with a dielectric or rare earth layer 106. The additional layer 106 may serve to preserve the resultant plasmon resonance and protect the particle from any temperature effects, for example, melting of the gold layer 104.

Figure 2:
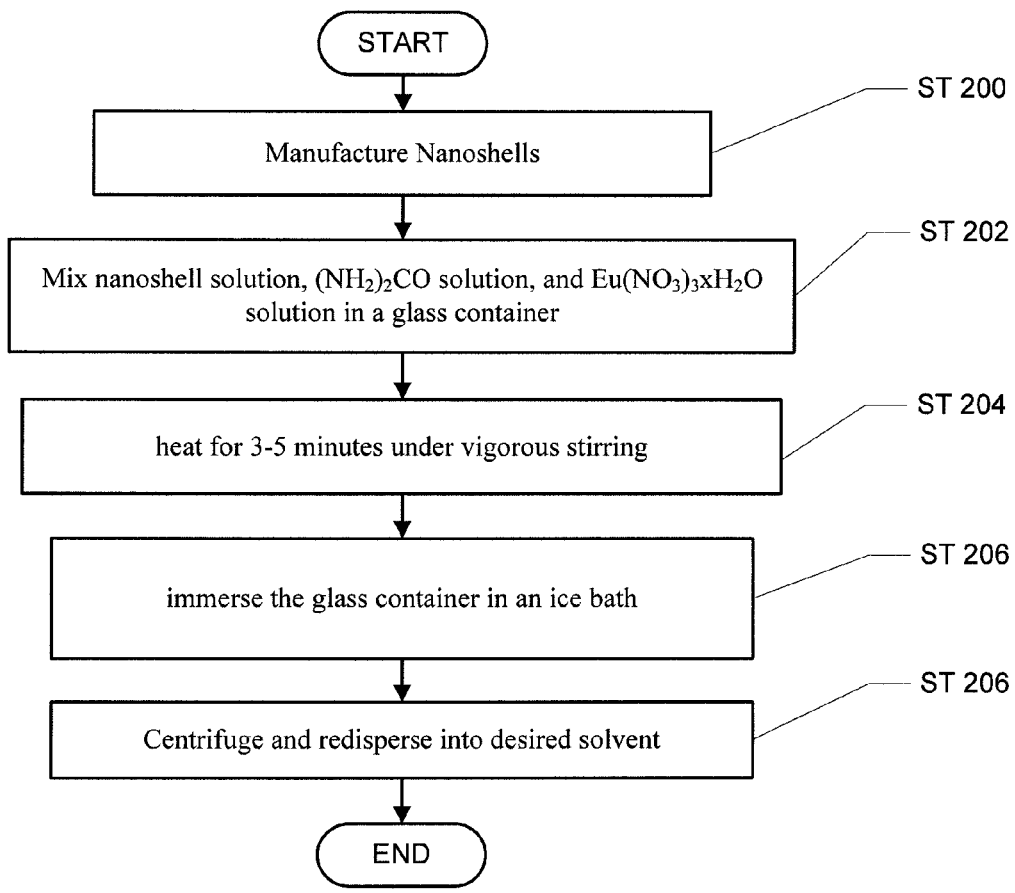
FIG. 2 shows a flow chart in accordance with one or more embodiments of the invention.

FIG. 2 is a flow chart of a method of manufacturing the coated nanoshells in accordance with one or more embodiments of the invention. In ST 200, nanoshells are manufactured according to known techniques. In the example of europium oxide, in ST 202, 20 mL of a nanoshell solution may be mixed with 10 mL of 2.5M $(NH_2)_2CO$ and 20 mL of 0.1M of $Eu(NO_3)_3 \cdot xH_2O$ solutions in a glass container. In ST 204, the mixture may be heated to boiling for 3-5 minutes under vigorous stirring. The time the mixture is heated may determine the thickness of the additional layer, and may also determine the number of nanoparticle aggregates in solution. The formation of nanostructure aggregates is known to create additional plasmon resonances at wavelengths higher than the individual nanostructure that may contribute to the energy absorbed by the nanostructure for heat generation. In ST 206, the reaction may then be stopped by immersing the glass container in an ice bath. In ST 208, the solution may then be cleaned by centrifugation, and then redispersed into the desired solvent. The additional layer may contribute to the solubility of the nanoparticles in different solvents. Solvents that may be used in one or more embodiments of the invention include, but are not limited to, water, ammonia, ethylene glycol, and glycerin.

In addition to europium, other examples of element oxides that may be used in the above recipe include, but are not limited to, erbium, samarium, praseodymium, and dysprosium. The additional layer is not limited to rare earth oxides. Any coating of the particle that may result in a higher melting point, better solubility in a particular solvent, better deposition onto a particular substrate, and/or control over the number of aggregates or plasmon resonance of the particle may be used. Examples of the other coatings that may be used in, but are not limited to silica, titanium dioxide, polymer-based coatings, additional layers formed by metals or metal alloys, and/or combinations of materials.

Figure 3:
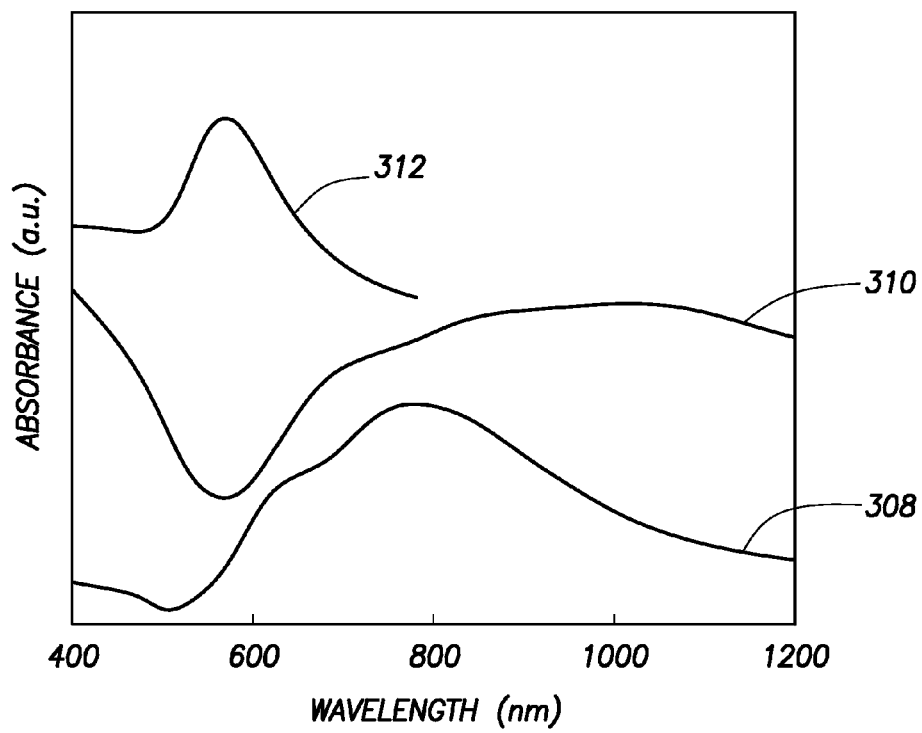
FIG. 3 shows a chart of the absorbance in accordance with one or more embodiments of the invention.

FIG. 3 is an absorbance spectrum of three nanoparticle structures that may be included in a complex in accordance with one or more embodiments disclosed herein. In FIG. 3, a gold nanoshell spectrum 308 may be engineered by selecting the core and shell dimensions to obtain a plasmon resonance peak at ~800 nm. FIG. 3 also includes a $Eu_2O_3$-encapsulated gold nanoshell spectrum 310, where the $Eu_2O_3$-encapsulated gold nanoshell is manufactured using the same nanoshells from the nanoshell spectrum 308. As may be seen in FIG. 3, there may be some particle aggregation in the addition of the europium oxide layer. However, the degree of particle aggregation may be controlled by varying the reaction time described above. FIG. 3 also includes a ~100 nm diameter spherical gold colloid spectrum 312 that may be used to absorb electromagnetic radiation in a different region of the electromagnetic spectrum. In the specific examples of FIG. 3, the $Eu_2O_3$-encapsulated gold nanoshells may be mixed with the gold colloids to construct a complex that absorbs any EM radiation from 500 nm to greater than 1200 nm. The concentrations of the different nanoparticle structures may be manipulated to achieve the desired absorption of the complex.

Figure 4A:
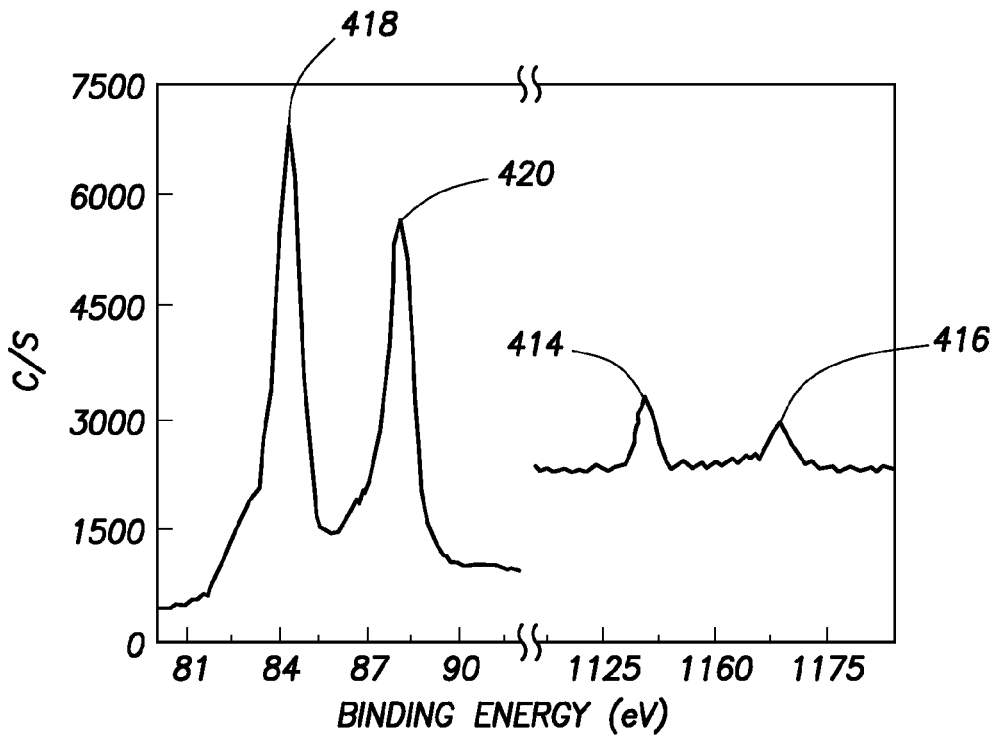
FIGS. 4A-4B show charts of an energy dispersive x-ray spectroscopy (EDS) measurement in accordance with one or more embodiments of the invention.
Figure 4B:
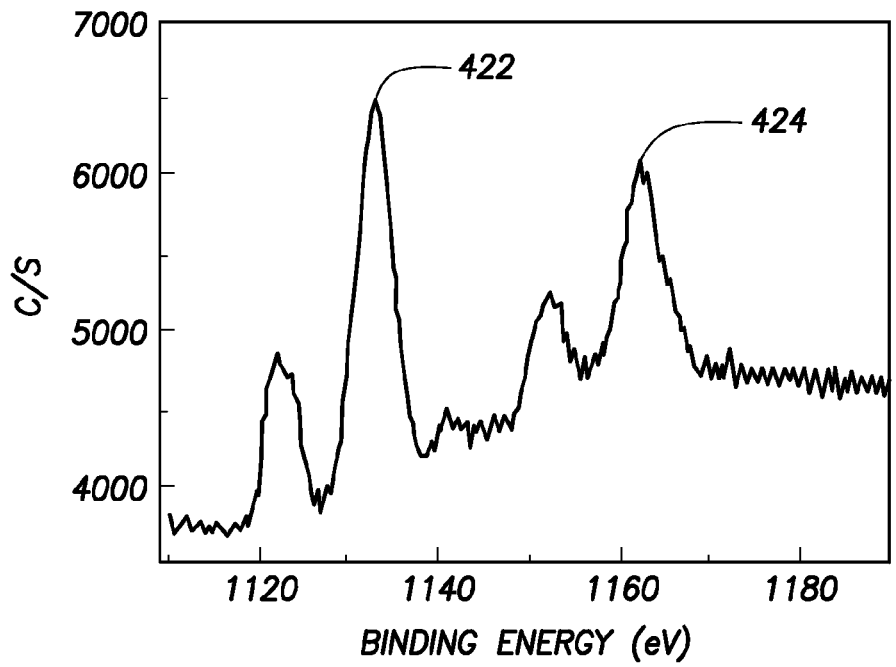

X-ray photoelectron spectroscopy (XPS) and/or energy dispersive x-ray spectroscopy (EDS) measurements may be used to investigate the chemical composition and purity of the nanoparticle structures in the complex. For example, FIG. 4A shows an XPS spectrum in accordance with one or more embodiments of the invention. XPS measurements were acquired with a PHI Quantera X-ray photoelectron spectrometer. FIG. 4A shows the XPS spectra in different spectral regions corresponding to the elements of the nanoshell encapsulated with europium oxide. FIG. 4A shows the XPS spectra display the binding energies for Eu (3d 5/2) at 1130 eV 414, Eu (2d 3/2) at 1160 eV 416, Au (4f 7/2) at 83.6 eV 418, and Au (4f 5/2) at 87.3 eV 420 of nanoshells encapsulated with europium oxide. For comparison, FIG. 4B shows an XPS spectrum of europium oxide colloids that may be manufactured according to methods known in the art. FIG. 4B shows the XPS spectra display the binding energies for Eu (3d 5/2) at 1130 eV 422 and Eu (2d 3/2) at 1160 eV 424 of europium oxide colloids.

Similar to above, in one or more embodiments of the invention, the complex may include solid metallic nanoparticles encapsulated with an additional layer as described above. For example, using the methods described above, solid metallic nanoparticles may be encapsulated using silica, titanium, europium, erbium, samarium, praseodymium, and dysprosium. Examples of solid metallic nanoparticles include, but are not limited to, spherical gold, silver, copper, or nickel nanoparticles or solid metallic nanorods. The specific metal may be chosen based on the plasmon resonance, or absorption, of the nanoparticle when encapsulated. The encapsulating elements may be chosen based on chemical compatibility, the encapsulating elements ability to increase the melting point of the encapsulated nanoparticle structure, and the collective plasmon resonance, or absorption, of a solution of the encapsulated nanostructure, or the plasmon resonance of the collection of encapsulated nanostructures when deposited on a substrate.

Figure 5:
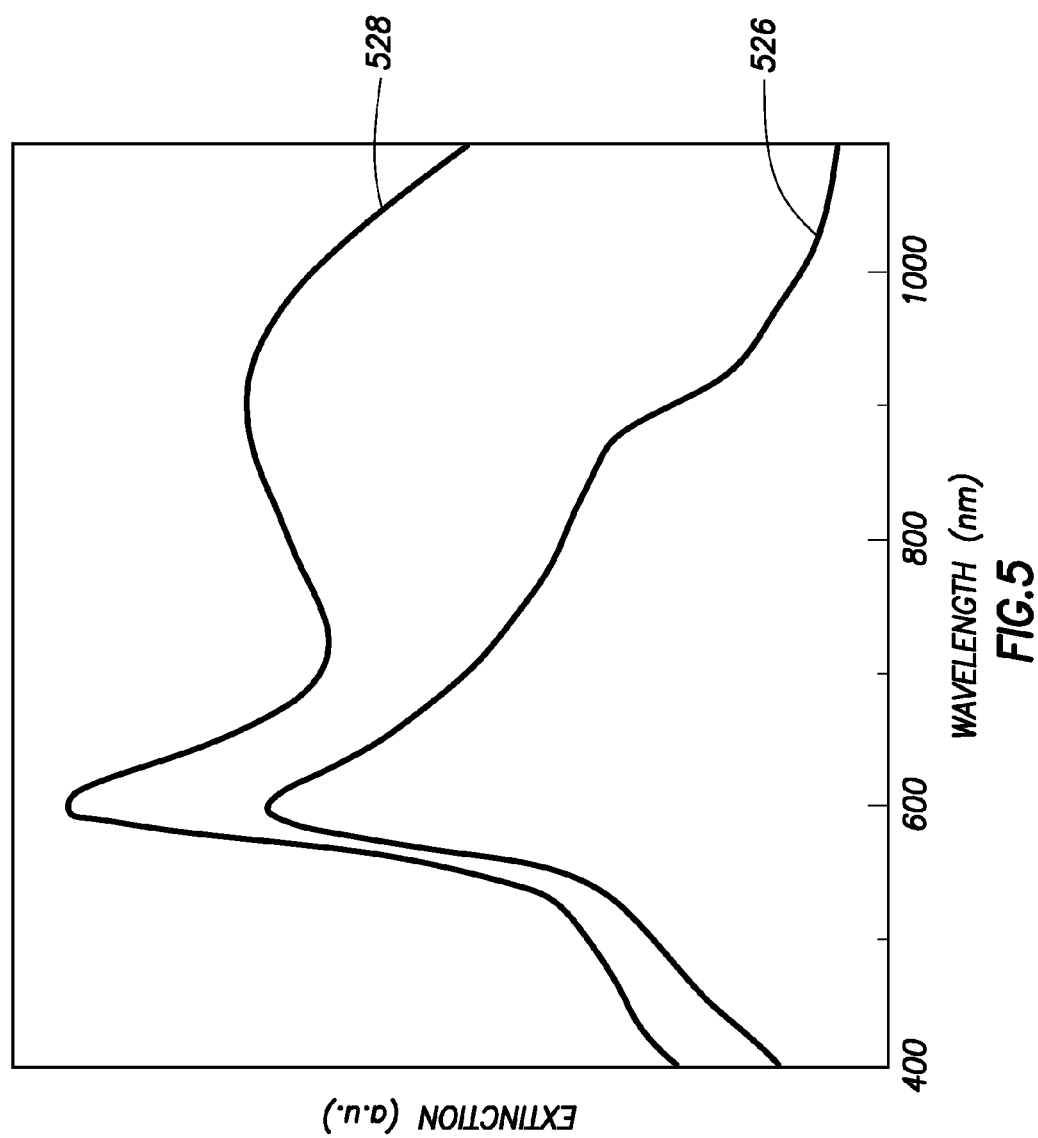
FIG. 5 shows a chart of the absorbance in accordance with one or more embodiments of the invention.

In one or more embodiments, the complex may also include copper colloids. Copper colloids may be synthesized using a solution-phase chemical reduction method. For example, 50 mL of 0.4 M aqueous solution of L-ascorbic acid, 0.8M of Polyvinyl pyridine (PVP), and 0.01M of copper (II) nitride may be mixed and heated to 70 degree Celsius until the solution color changes from a blue-green color to a red color. The color change indicates the formation of copper nanoparticles. FIG. 5 is an experimental and theoretical spectrum in accordance with one or more embodiments of the invention. FIG. 5 includes an experimental absorption spectrum 526 of copper colloids in accordance with one or more embodiments of the invention. Therefore, copper colloids may be used to absorb electromagnetic radiation in the 550 nm to 900 nm range.

FIG. 5 also includes a theoretical absorption spectrum 528 calculated using Mie scattering theory. In one or more embodiments, Mie scattering theory may be used to theoretically determine the absorbance of one or more nanoparticle structures to calculate and predict the overall absorbance of the complex. Thus, the complex may be designed to maximize the absorbance of solar electromagnetic radiation.

Figure 6:
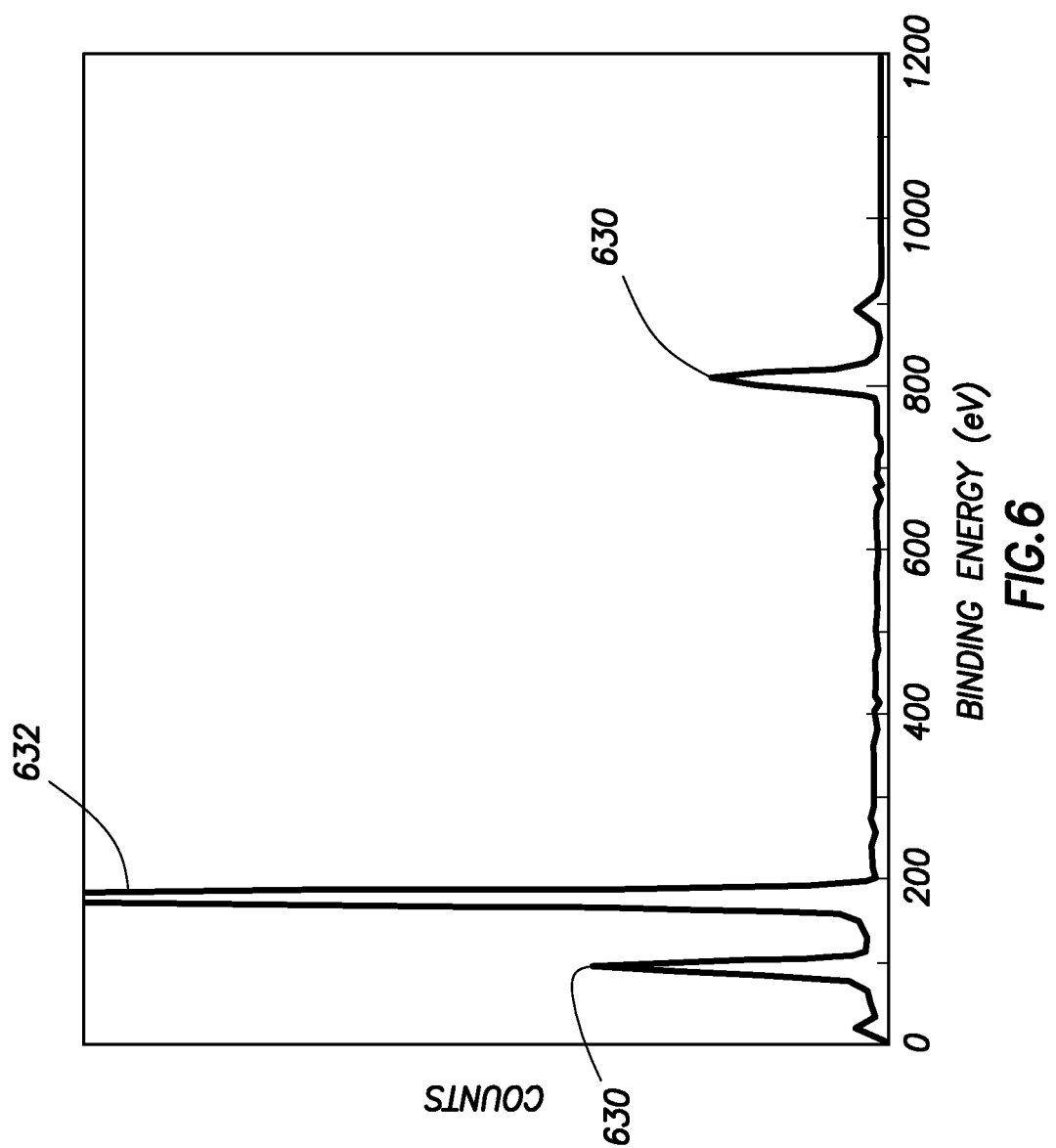
FIG. 6 shows a chart of an EDS measurement in accordance with one or more embodiments of the invention.

Referring to FIG. 6, an EDS spectrum of copper colloids in accordance with one or more embodiments of the invention is shown. The EDS spectrum of the copper colloids confirms the existence of copper atoms by the appearance peaks 630. During the EDS measurements, the particles are deposited on a silicon substrate, as evidenced by the presence of the silicon peak 632.

Figure 7:
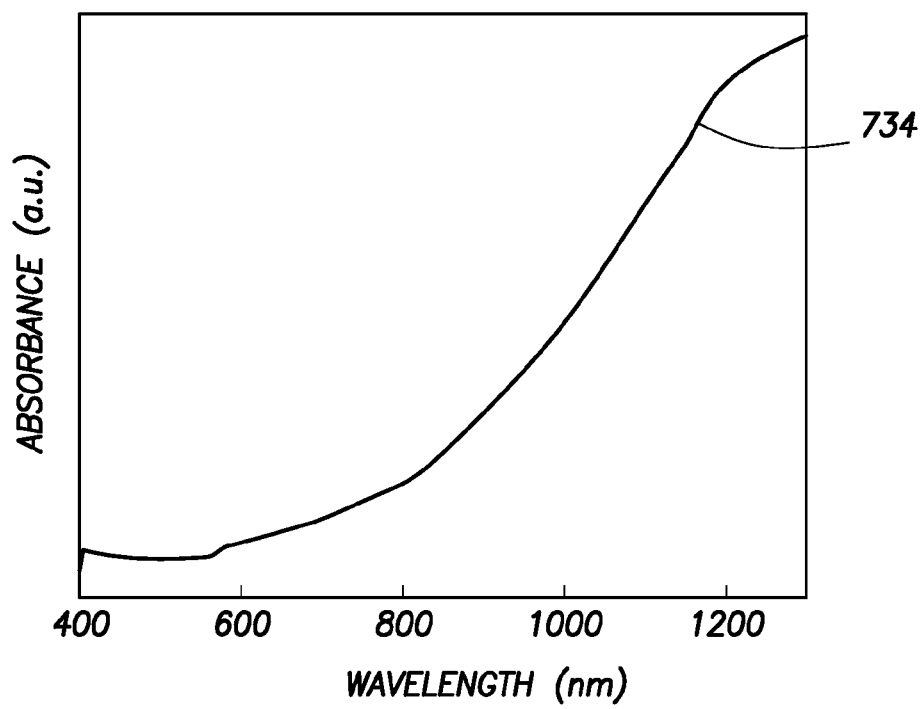
FIG. 7 shows a chart of the absorbance in accordance with one or more embodiments of the invention.

In one or more embodiments, the complex may include copper oxide nanoparticles. Copper oxide nanostructures may be synthesized by 20 mL aqueous solution of 62.5 mM $Cu(NO_3)_2$ being directly mixed with 12 mL $NH_4OH$ under stirring. The mixture may be stirred vigorously at approximately 80° C. for 3 hours, then the temperature is reduced to 40° C. and the solution is stirred overnight. The solution color turns from blue to black color indicating the formation of the copper oxide nanostructure. The copper oxide nanostructures may then be washed and re-suspended in water via centrifugation. FIG. 7 shows the absorption of copper oxide nanoparticles in accordance with one or more embodiments of the invention. The absorption of the copper oxide nanoparticles 734 may be used to absorb electromagnetic radiation in the region from ~900 nm to beyond 1200 nm.

Figure 8:
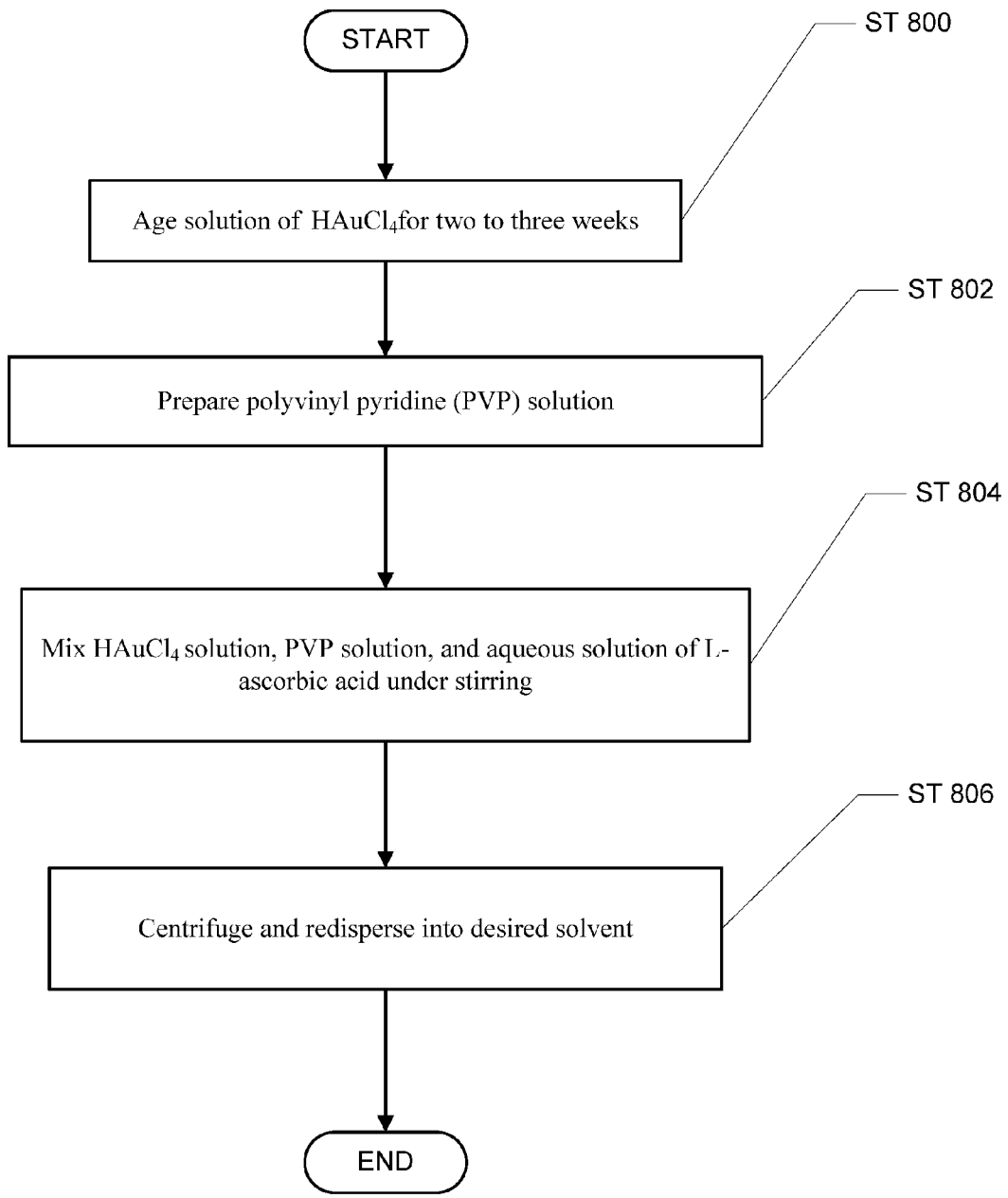
FIG. 8 shows a flow chart in accordance with one or more embodiments of the invention.

In one or more embodiments of the invention, the complex may include branched nanostructures. One of ordinary skill in the art will appreciate that embodiments of the invention are not limited to strict gold branched structures. For example, silver, nickel, copper, or platinum branched structures may also be used. FIG. 8 is a flow chart of the method of manufacturing gold branched structures in accordance with one or more embodiments of the invention. In ST 800, an aqueous solution of 1% $HAuCl_4$ may be aged for two-three weeks. In ST 802, a polyvinyl pyridine (PVP) solution may be prepared by dissolving 0.25 g in approximately 20 mL ethanol solution and rescaled with water to a final volume of 50 mL. In ST 804, 50 mL of the 1% $HAuCl_4$ and 50 mL of the PVP solution may be directly mixed with 50 mL aqueous solution of 0.4M L-ascorbic acid under stirring. The solution color may turn immediately in dark blue-black color which indicates the formation of a gold nanoflower or nano-coral. Then, in ST 806, the Au nanostructures may then be washed and resuspended in water via centrifugation. In other words, the gold branched nanostructures may be synthesized through L-ascorbic acid reduction of aqueous chloroaurate ions at room temperature with addition of PVP as the capping agent. The capping polymer PVP may stabilize the gold branched nanostructures by preventing them from aggregating. In addition, the gold branched nanostructures may form a porous polymer-type matrix.

Figure 9:
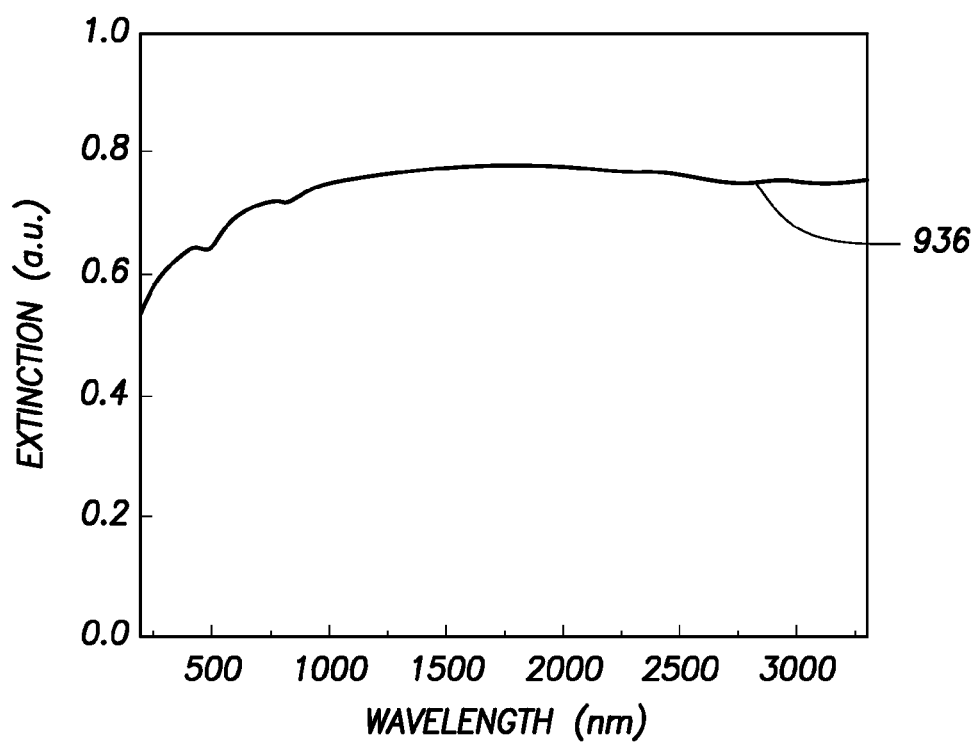
FIG. 9 shows a chart of the absorbance in accordance with one or more embodiments of the invention.

FIG. 9 shows the absorption of a solution of gold branched nanostructures in accordance with one or more embodiments of the invention. As can be seen in FIG. 9, the absorption spectrum 936 of the gold branched nanostructures is almost flat for a large spectral range, which may lead to considerably high photon absorption. The breadth of the spectrum 936 of the gold branched nanostructures may be due to the structural diversity of the gold branched nanostructures or, in other works, the collective effects of which may come as an average of individual branches of the gold branched/corals nanostructure.

Figure 10:
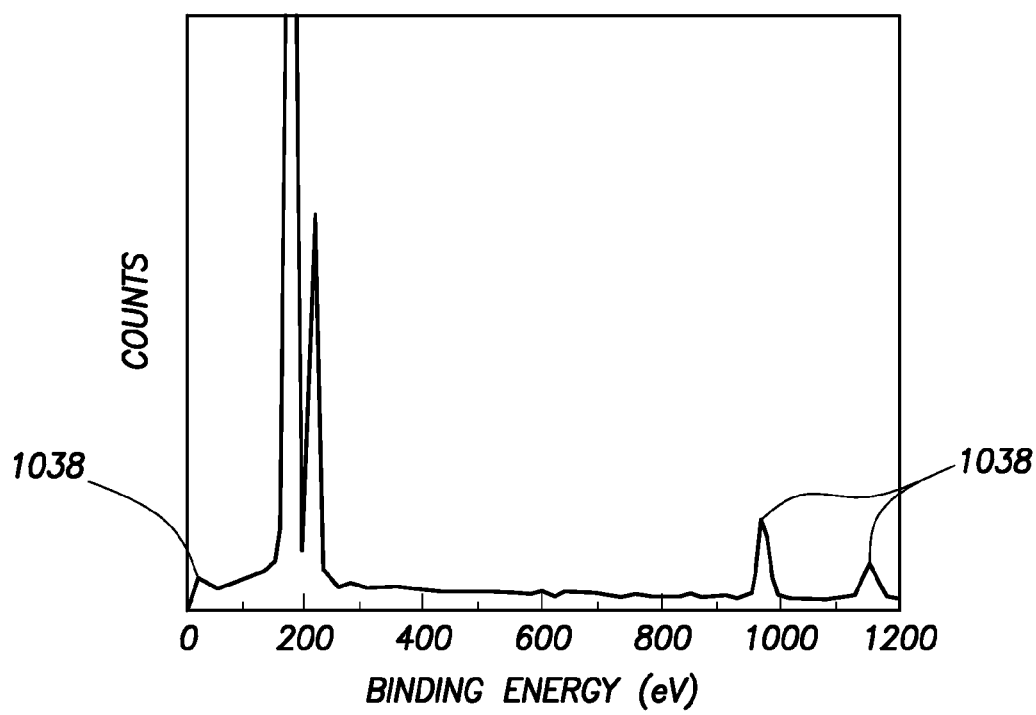
FIG. 10 shows a chart of an EDS measurement in accordance with one or more embodiments of the invention.

FIG. 10 shows the EDS measurements of the gold branched nanostructures in accordance with one or more embodiments of the invention. The EDS measurements may be performed to investigate the chemical composition and purity of the gold branched nanostructures. In addition, the peaks 1038 in the EDS measurements of gold branched nanostructures confirm the presence of Au atoms in the gold branched nanostructures.

Figure 11A:
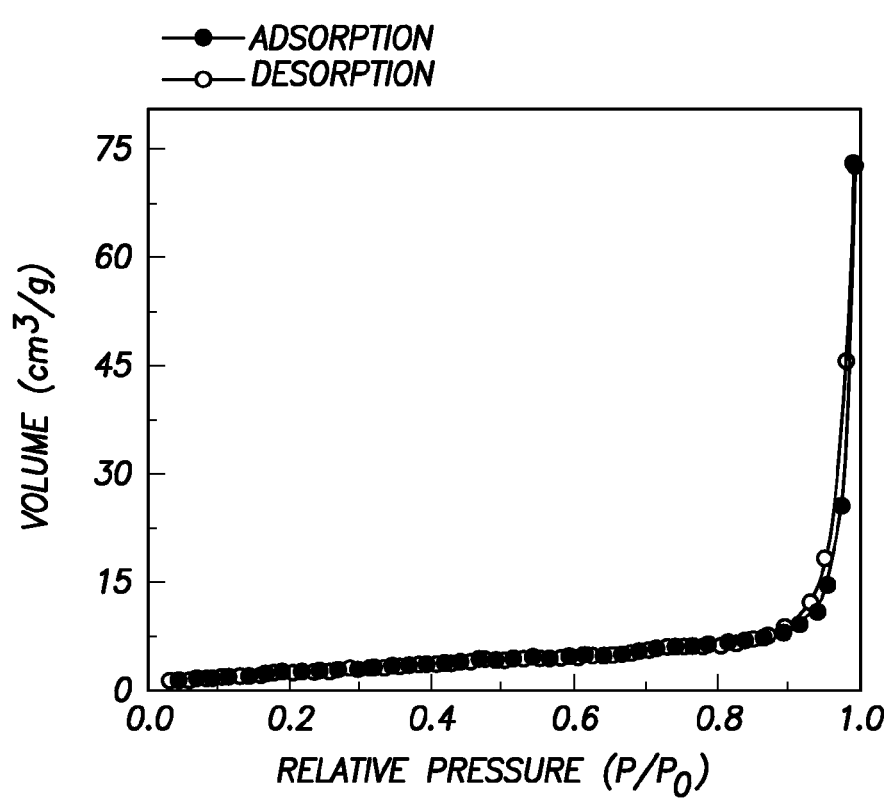
FIGS. 11A-11C show charts of the porosity of gold corral structures in accordance with one or more embodiments of the invention.
Figure 11B:
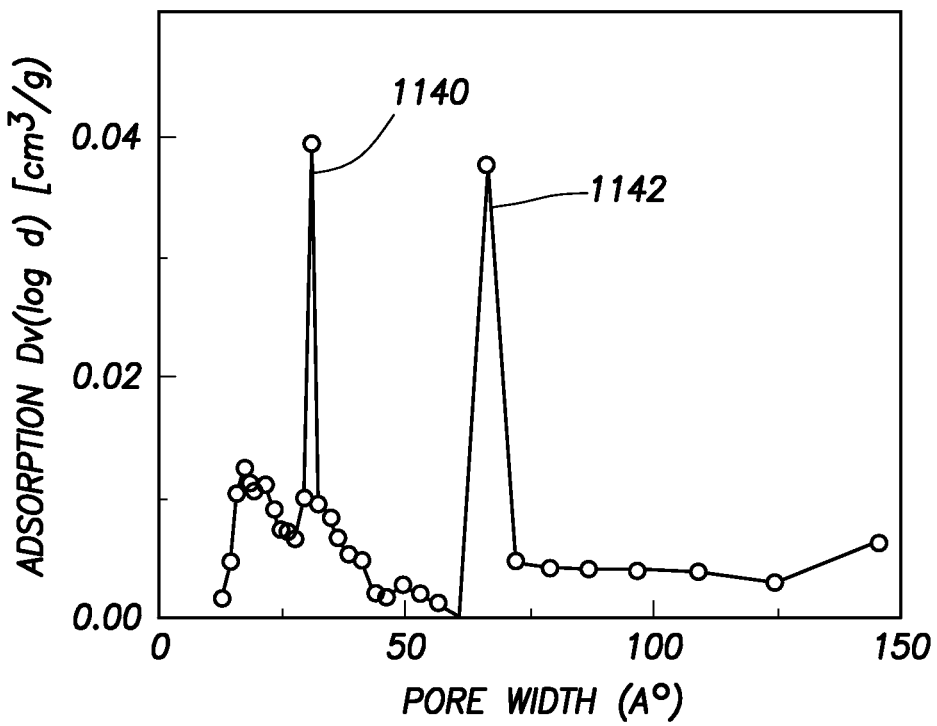
Figure 11C:
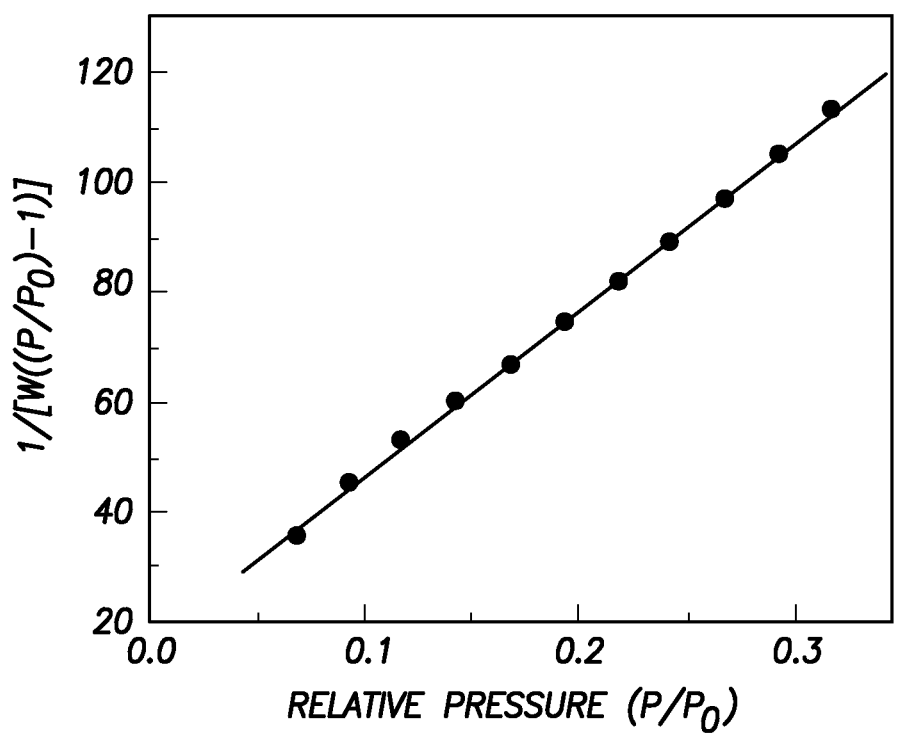

FIG. 11 shows a Brunauer-Emmett-Teller (BET) surface area and pore size distribution analysis of branches in accordance with one or more embodiments of the invention. The BET surface area and pore size may be performed to characterize the branched nanostructures. FIG. 11A presents the nitrogen adsorption-desorption isotherms of a gold corral sample calcinated at 150° C. for 8 hours. The isotherms may exhibit a type IV isotherm with a $N_2$ hysteresis loops in desorption branch as shown. As shown in FIG. 11A, the isotherms may be relatively flat in the low-pressure region ($P/P_0 < 0.7$). Also, the adsorption and desorption isotherms may be completely superposed, a fact which may demonstrate that the adsorption of the samples mostly likely occurs in the pores. At the relative high pressure region, the isotherms may form a loop due to the capillarity agglomeration phenomena. FIG. 11B presents a bimodal pore size distribution, showing the first peak 1140 at the pore diameter of 2.9 nm and the second peak 1142 at 6.5 nm. FIG. 11C shows the BET plots of gold branched nanostructures in accordance with one or more embodiments of the invention. A value of 10.84 $m^2/g$ was calculated for the specific surface area of branches in this example by using a multipoint BET-equation.

In one or more embodiments of the invention, the gold branched nanostructures dispersed in water may increase the nucleation sites for boiling, absorb electromagnetic energy, decrease the bubble lifetime due to high surface temperature and high porosity, and increase the interfacial turbulence by the water gradient temperature and the Brownian motion of the particles. The efficiency of a gold branched complex solution may be high because it may allow the entire fluid to be involved in the boiling process.

As demonstrated in the above figures and text, in accordance with one or more embodiments of the invention, the complex may include a number of different specific nanostructures chosen to maximize the absorption of the complex in a desired region of the electromagnetic spectrum. In addition, the complex may be suspended in different solvents, for example water or ethylene glycol. Also, the complex may be deposited onto a surface according to known techniques. For example, a molecular or polymer linker may be used to fix the complex to a surface, while allowing a solvent to be heated when exposed to the complex. The complex may also be embedded in a matrix or porous material. For example, the complex may be embedded in a polymer or porous matrix material formed to be inserted into a particular embodiment as described below. For example, the complex could be formed into a removable cartridge. As another example, a porous medium (e.g., fiberglass) may be embedded with the complex and placed in the interior of a vessel containing a fluid to be heated. The complex may also be formed into shapes in one or more embodiments described below in order to maximize the surface of the complex and, thus, maximize the absorption of EM radiation. In addition, the complex may be embedded in a packed column or coated onto rods inserted into one or more embodiments described below.

Figure 12A:
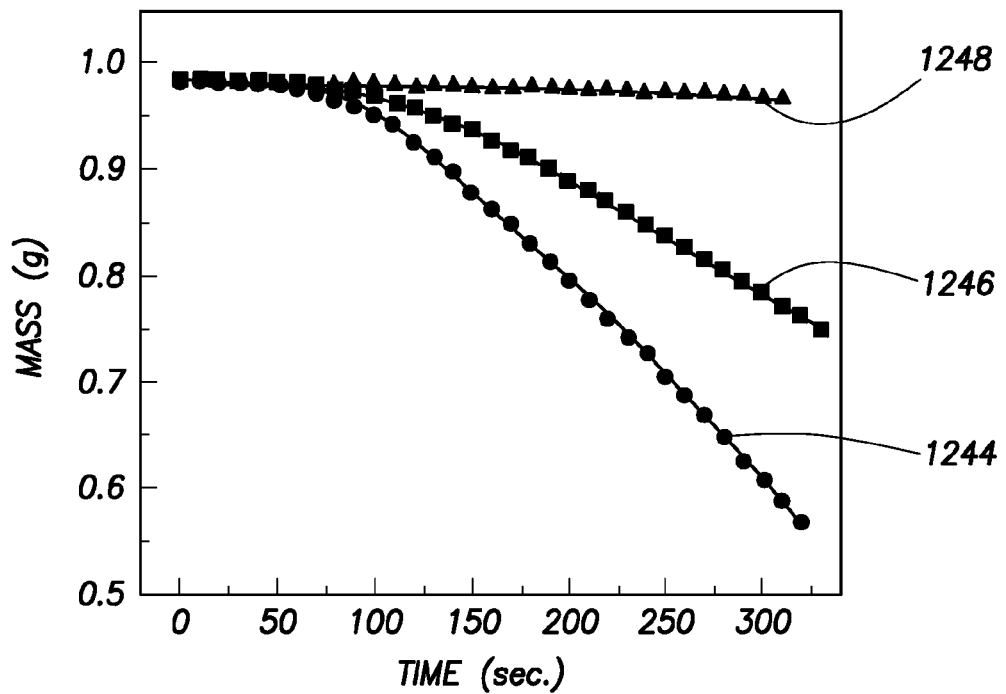
FIGS. 12A-12C show charts of the mass loss of water into steam in accordance with one or more embodiments of the invention.
Figure 12B:
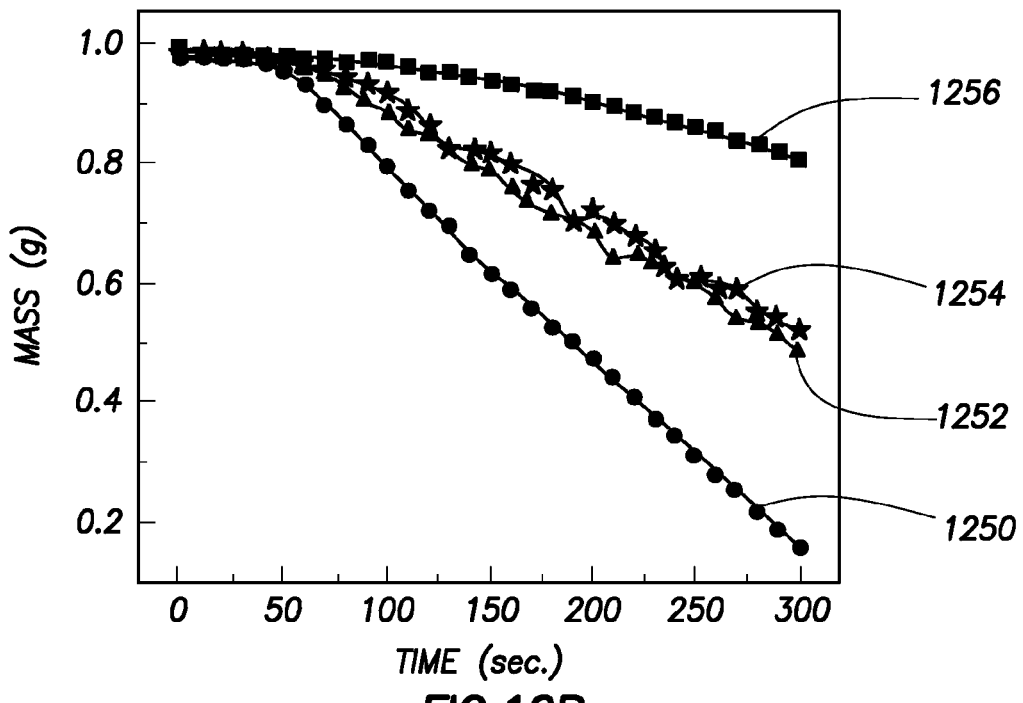
Figure 12C:
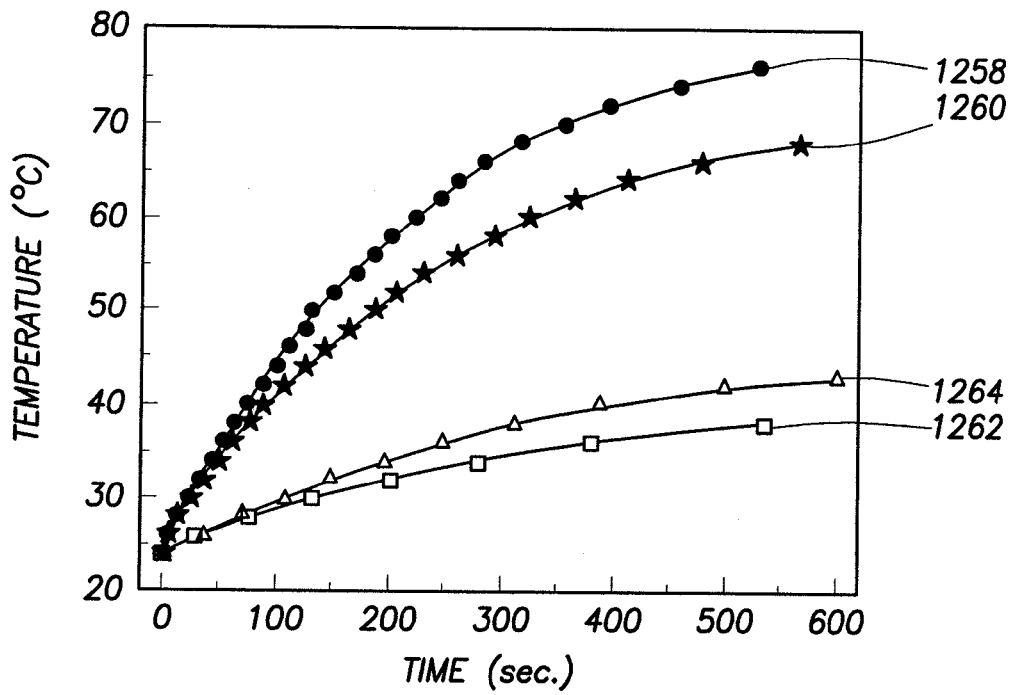

FIGS. 12A-12C show charts of the mass loss and temperature increase of different nanostructures that may be used in a complex in accordance with one or more embodiments of the invention. The results shown in FIGS. 12A-12C were performed to monitor the mass loss of an aqueous nanostructure solution for 10 minutes under sunlight (FIG. 12B) versus non-pulsed diode laser illumination at 808 nm (FIG. 12A). In FIG. 12A, the mass loss versus time of the laser illumination at 808 nm is shown for $Eu_2O_3$-coated nanoshells 1244, non-coated gold nanoshells 1246, and gold nanoparticles with a diameter of ~100 nm 1248. Under laser exposure, as may be expected from the absorbance shown in FIG. 3, at 808 nm illumination, the coated and non-coated nanoshells exhibit a mass loss due to the absorbance of the incident electromagnetic radiation at 808 nm. In addition, as the absorbance is lower at 808 nm, the 100 nm diameter gold colloid exhibits little mass loss at 808 nm illumination. In FIG. 12A, the Au nanoparticles demonstrated a lower loss rate that was nearly the same as water because the laser wavelength was detuned from plasmon resonance frequency. The greatest mass loss was obtained by adding a layer around the gold nanoshells, where the particle absorption spectrum was approximately the same as the solar spectrum (see FIG. 3.)

In FIG. 12B, the mass loss as a function of time under exposure to the sun in accordance with one or more embodiments of the invention is shown. In FIG. 12B, the mass loss under sun exposure with an average power of 20 W is shown for $Eu_2O_3$-coated nanoshells 1250, non-coated gold nanoshells 1252, gold nanoparticles with a diameter of ~100 nm 1254, and a water control 1256. As in the previous example, the greatest mass loss may be obtained by adding a rare earth or dielectric layer around a nanoshell.

The resulting mass loss curves in FIGS. 12A and 12B show significant water evaporation rates for $Eu_2O_3$-coated gold nanoshells. The mass loss may be slightly greater under solar radiation because the particles were able to absorb light from a broader range of wavelengths. In addition, the collective effect of aggregates broadens the absorption spectrum of the oxide-coated nanoparticles, which may help to further amplify the heating effect and create local areas of high temperature, or local hot spots. Aggregates may also allow a significant increase in boiling rates due to collective self organizing forces. The oxide layer may further enhance steam generation by increasing the surface area of the nanoparticle, thus providing more boiling nucleation sites per particle, while conserving the light-absorbing properties of the nanostructure.

FIG. 12C shows the temperature increase versus time under the 808 nm laser exposure in accordance with one or more embodiments of the invention. In FIG. 12C, the temperature increase under the 808 nm laser exposure is shown for $Eu_2O_3$-coated nanoshells 1258, non-coated gold nanoshells 1260, gold nanoparticles with a diameter of ~100 nm 1262, and a water control 1264. As may be expected, the temperature of the solutions of the different nanostructures that may be included in the complex increases due to the absorption of the incident electromagnetic radiation of the specific nanostructure and the conversion of the absorbed electromagnetic radiation in to heat.

Figure 13B:
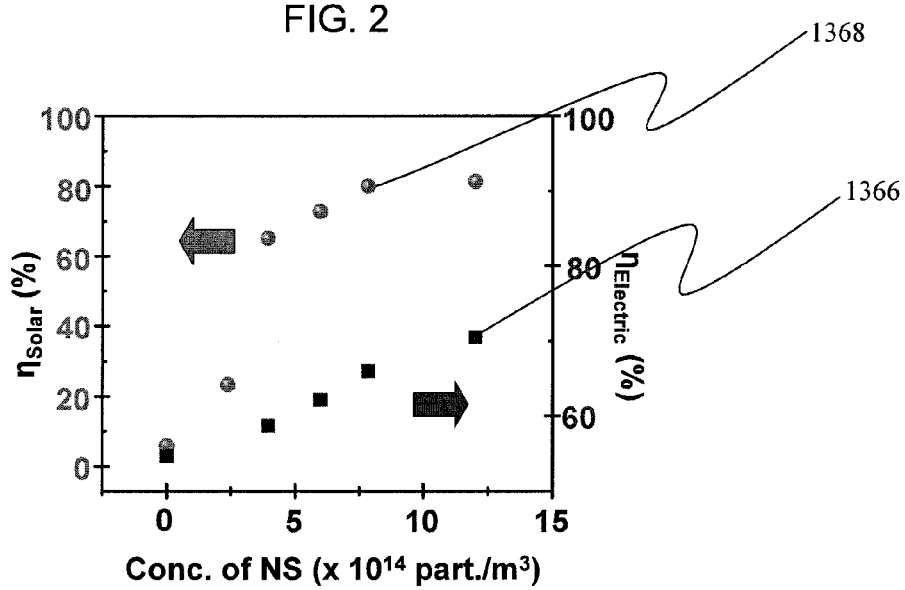
FIG. 13A-13B show charts of the energy capture efficiency in accordance with one or more embodiments of the invention.
Figure 13A:
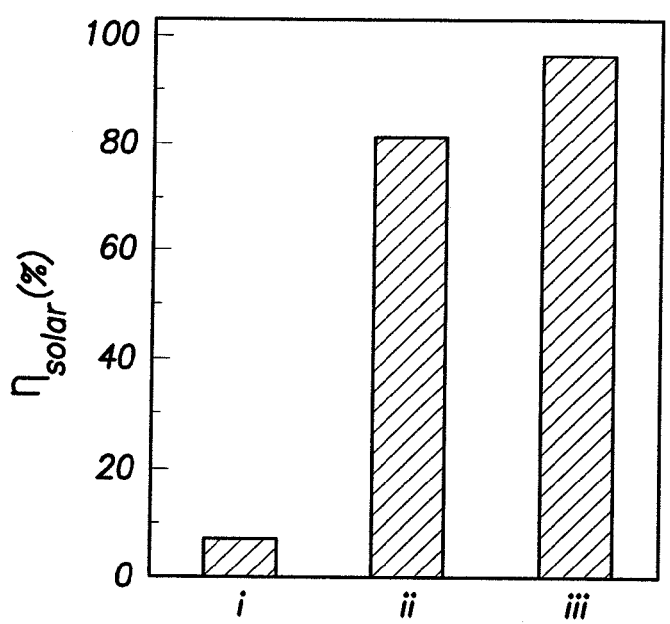

FIG. 13A is a chart of the solar trapping efficiency in accordance with one or more embodiments of the invention. To quantify the energy trapping efficiency of the complex, steam is generated in a flask and throttled through a symmetric convergent-divergent nozzle. The steam is then cooled and collected into an ice bath maintained at 0° C. The nozzle serves to isolate the high pressure in the boiler from the low pressure in the ice bath and may stabilize the steam flow. Accordingly, the steam is allowed to maintain a steady dynamic state for data acquisition purposes. In FIG. 13A, the solar energy capture efficiency (11) of water (i) and Eu2O3-coated nanoshells (ii) and gold branched (ii) nanostructures is shown. The resulting thermal efficiency of steam formation may be estimated at 80% for the coated nanoshell complex and 95% for a gold branched complex. By comparison, water has approximately 10% efficiency under the same conditions.

In one or more embodiments of the invention, the concentration of the complex may be modified to maximize the efficiency of the system. For example, in the case where the complex is in solution, the concentration of the different nanostructures that make up the complex for absorbing EM radiation may be modified to optimize the absorption and, thus, optimize the overall efficiency of the system. In the case where the complex is deposited on a surface, the surface coverage may be modified accordingly.

In FIG. 13B, the steam generation efficiency versus gold nanoshell concentration for solar and electrical heating in accordance with one or more embodiments of the invention is shown. The results show an enhancement in efficiency for both electrical 1366 and solar 1368 heating sources, confirming that the bubble nucleation rate increases with the concentration of complex. At high concentrations, the complex is likely to form small aggregates with small inter-structure gaps. These gaps may create "hot spots", where the intensity of the electric field may be greatly enhanced, causing an increase in temperature of the surrounding water. The absorption enhancement under electrical energy 1366 is not as dramatic as that under solar power 1368 because the solar spectrum includes energetic photons in the NIR, visible and UV that are not present in the electric heater spectrum. At the higher concentrations, the steam generation efficiency begins to stabilize, indicating a saturation behavior. This may result from a shielding effect by the particles at the outermost regions of the flask, which may serve as a virtual blackbody around the particles in the bulk solution.

Figure 14:
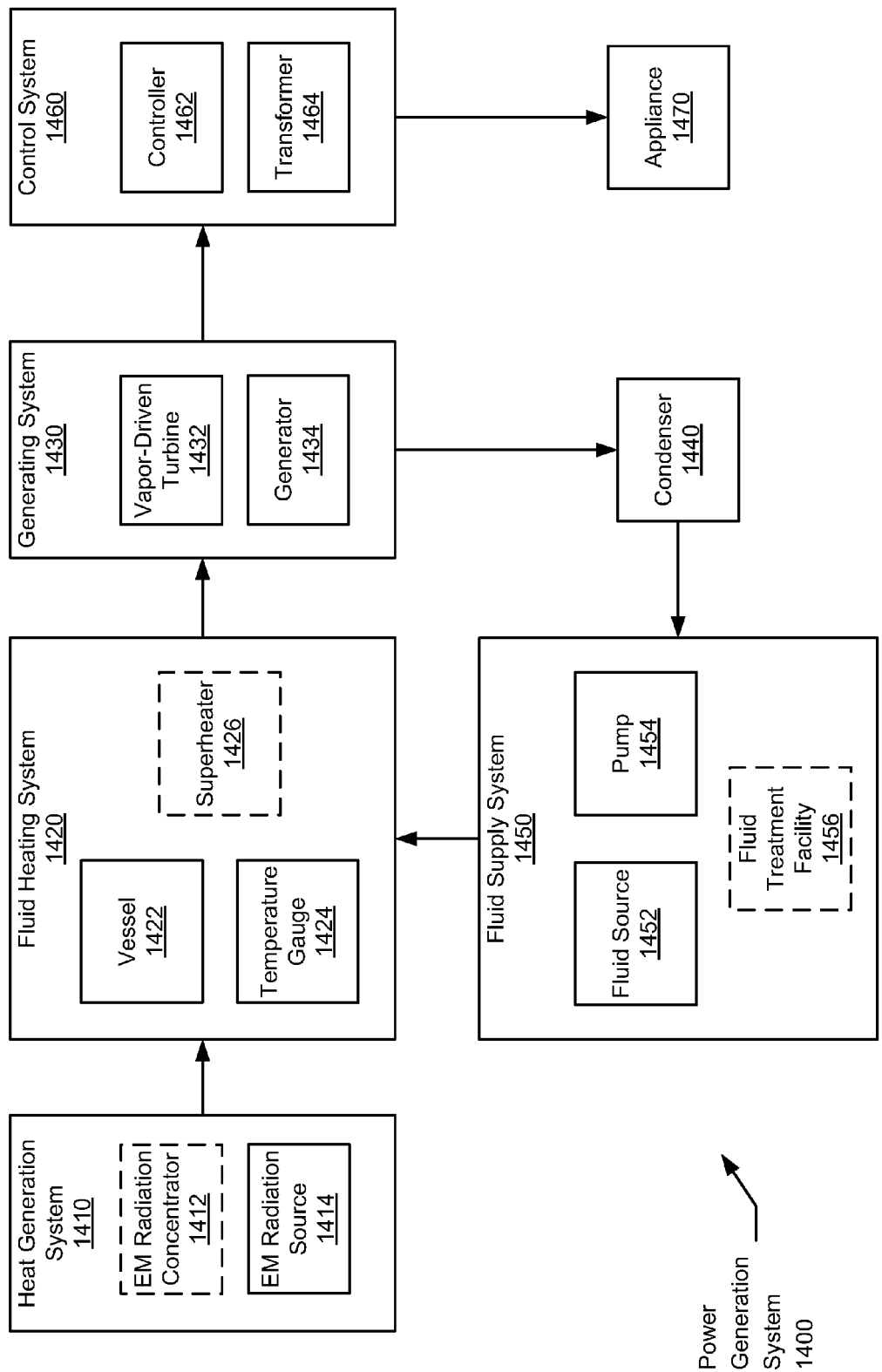
FIG. 14 shows a system in accordance with one or more embodiments of the invention.

FIG. 14 shows a system 1400 for creating vapor for electric generation in accordance with one or more embodiments of the invention. The power generation system 1400 includes a heat generation system 1410, a fluid heating system 1420, a generating system 1430, a condenser 1440, a fluid supply system 1450, and a control system 1460. The heat generation system 1410 includes an EM radiation source 1414 and, optionally, an EM radiation concentrator 1412. The fluid heating system 1420 includes a vessel with a complex 1422, a temperature gauge 1424, and, optionally, a superheater 1426. The generating system 1430 includes a vapor-driven turbine 1432 and a generator 1434. The fluid supply system 1450 includes a fluid source 1452, a pump 1454, and, optionally, a fluid treatment facility 1456. The control system 1460 includes a controller 1462 and a transformer 1464. Each of these components is described with respect FIG. 14 below. One of ordinary skill in the art will appreciate that embodiments of the invention are not limited to the configuration shown in FIG. 14.

Each component shown in FIG. 14, as well as any other component implied and/or described but not shown in FIG. 14, may be configured to receive material from one component (i.e., an upstream component) of the power generation system 1400 and send material (either the same as the material received or material that has been altered in some way (e.g., vapor to fluid)) to another component (i.e., a downstream component) of the power generation system 1400. In all cases, the material received from the upstream component may be delivered through a series of pipes, pumps, valves, and/or other devices to control factors associated with the material received such as the flow rate, temperature, and pressure of the material received as it enters the component. Further, the fluid and/or vapor may be delivered to the downstream component using a different series of pipes, pumps, valves, and/or other devices to control factors associated with the material sent such as the flow rate, temperature, and pressure of the material sent as it leaves the component.

In one or more embodiments of the invention, the complex based system may be incorporated into the air cooling device. For example, the heat generating system, fluid heating system, and/or condenser system described above may be considered part of the air cooling device. Typically, an air cooling system includes a condenser, compressor and evaporator. One of ordinary skill in the art will appreciate the similarity between the functionality of a compressor and the heat generation system and fluid heating system described above. In addition, the fluid supply system and condenser of the invention are typical components used in an air cooling device.

In one or more embodiments of the invention, the heat generation system 1410 of the power generation system 1400 is configured to provide EM radiation. In one or more embodiments of the invention, the EM radiation source 1414 is any source capable of emitting EM radiation having one or a range of wavelengths. The EM radiation source 1414 may be a stream of flue gas derived from a combustion process using a fossil fuel, including but not limited to coal, fuel oil, natural gas, gasoline, and propane. In one or more embodiments of the invention, the stream of flue gas is created during the production of heat and/or electric power using a boiler to heat water using one or more fossil fuels. The stream of flue gas may also be created during some other industrial process, including but not limited to chemical production, petroleum refining, and steel manufacturing. The stream of flue gas may be conditioned before being received by the heat generation system 1410. For example, a chemical may be added to the stream of flue gas, or the temperature of the stream of flue gas may be regulated in some way. Conditioning the stream of flue gas may be performed using a separate system designed for such a purpose.

In one or more embodiments of the invention, the EM radiation source 1414 is some other natural and/or manmade source, including but not limited to the sun, a light bulb, and captured waste heat. The EM radiation source may be external to the heat generation system 1410. The EM radiation source 1414 may also be a suitable combination of sources of EM radiation, whether emitting energy using the same wavelengths or different wavelengths.

Optionally, in one or more embodiments of the invention, the EM radiation concentrator 1412 is a device used to intensify the energy emitted by the EM radiation source 1414. Examples of an EM radiation concentrator 1412 include, but are not limited to, a lens, a parabolic trough, black paint, or any suitable combination thereof. The EM radiation concentrator 1412 may be used to increase the rate at which the EM radiation is absorbed by the complex.

In one or more embodiments of the invention, the fluid heating system 1420 of the power generation system 1400 is configured to transform (i.e., convert) the fluid into vapor. Specifically, the vessel 1422 of the fluid heating system 1420 may include the complex used to heat the fluid. The vessel 1422 may include a liquid solution (or some other material, liquid or otherwise) that includes the complex, be coated on one or more inside surfaces with a coating of the complex, be coated on one or more outside surfaces with a coating of the complex, be constructed of a material that includes the complex, or any combination thereof. The vessel 1422 may also be adapted to facilitate one or more EM radiation concentrators 1412, as described above. The vessel 1422 may be of any size, shape, color, degree of translucence/transparency, or any other characteristic suitable for the amount and type of vapor required to generate the electricity. For example, the vessel 1422 may be a large, cylindrical tank holding a quantity of solution that includes the complex and with a number of lenses (acting as EM radiation concentrators) along the lid and upper walls. In such a case, the solution may include the fluid being used to be transformed into vapor. Further, in such a case, the fluid includes properties such that the complex remains in the solution when a filtering system (described below) is used. Alternatively, the vessel 1422 may be a translucent pipe with the interior surfaces coated with a substrate of the complex, where the pipe is positioned at the focal point of a parabolic trough (acting as an EM radiation concentrator) made of reflective metal.

In one or more embodiments of the invention, the vessel 1422 includes one or more temperature gauges 1424 to measure a temperature at different points inside the vessel 1422. For example, a temperature gauge 1424 may be placed at the point in the vessel 1422 where the vapor exits the vessel 1422. Such temperature gauge 1424 may be operatively connected to a control system (not shown) used to control the amount and/or quality of vapor produced for generating electric power. In one or more embodiments of the invention, the vessel 1422 may be pressurized where the pressure is read and/or controlled using a pressure gauge (not shown). Those skilled in the art will appreciate one or more control systems used to generate steam for generating electricity may involve a number of devices, including but not limited to temperature gauges, pressure gauges, pumps, fans, and valves, controlled (manually and/or automatically) according to a number of protocols and operating procedures.

In one or more embodiments of the invention, the vessel 1422 may also include a filtering system located inside the vessel 1422 to capture impurities in the fluid that are not converted to vapor with the fluid. The filtering system may vary, depending on a number of factors, including but not limited to the configuration of the vessel 1422, or the purity requirements of the vapor. The filtering system may be integrated with the control system. For example, the filtering system may operate within a temperature range measured by one or more temperature gauges 1424.

Optionally, in one or more embodiments of the invention, the fluid heating system 1420 includes a superheater 1426. The superheater 1426 may be used to increase the temperature of the vapor to a level required by the vapor-driven turbine 1432. The superheater 1426 and similar devices used to process the vapor so that the characteristics of the vapor are within the operating requirements of the vapor-driven turbine 1432 are known in the art and will not be described further herein.

In one or more embodiments of the invention, the generating system 1430 of the power generation system 1400 is configured to use the vapor to generate electricity. The vapor-driven turbine 1432 may include one or more chambers (e.g., sets of turbine blades) operating at one or more different pressures. The vapor-driven turbine 1432 may also include different sizes of turbine blades. In one or more embodiments of the invention, the vapor-driven turbine 1432 is sized in accordance with the specifications of the generator 1434. Those skilled in the art will appreciate that the vapor-driven turbine 1432 of the generating system 1430 may be any type of turbine, now known or to be discovered, adapted to receive vapor, which turns one or more blades of the turbine.

In one or more embodiments of the invention, the generator 1434 of the generating system 1430 rotates in response to the turning of the turbine blades of the vapor-driven turbine 1432 to create electricity. Specifically, the generator 1434 may include a rotor that rotates inside a stator, inducing electromagnetic current in the stator. The rotor of the generator 1434 may be connected to the vapor-driven turbine 1432 by a shaft. The generator 1434 may be capable of generating any amount of power, from a few kilowatts (or less) to several hundred megawatts (or more). Those skilled in the art will appreciate that the generator 1434 may be any type of generator, now known or to be discovered, adapted to create electromagnetic current.

In one or more embodiments of the invention, the condenser 1440 of the power generation system 1400 is configured to condense the vapor received from the generating system 1430 to fluid. The fluid condensed by the condenser 1440 may be the same as the fluid received by the fluid heating system 1420 described above. The condenser 1440 may use air, water, or any other suitable material/medium to cool the vapor. The condenser 1440 may also operate under a particular pressure, such as under a vacuum. Those skilled in the art will appreciate that the condenser 1440 may be any type of condenser, now known or to be discovered, adapted to liquefy a vapor.

In one or more embodiments of the invention, the fluid supply system 1450 of the power generation system 1400 is configured to supply fluid to the fluid heating system 1420. The fluid source 1452 of the fluid supply system 1450 may be any source of fluid. For example, the fluid source 1452 may include, but is not limited to, the condenser 1440, a pond, a lake, a chemical mixing tank, recycled fluid from a closed-loop system (described below), some other suitable source, or any combination thereof. The flow of fluid to and/or from the fluid source 1452 may be controlled by one or more pumps 1454, which may operate manually or automatically (as with a control system, described above). Each pump 1454 may operate using a variable speed motor or a fixed speed motor.

Optionally, in one or more embodiments of the invention, the fluid treatment facility 1456 is used to treat the fluid received by the fluid supply system 1450 so that the fluid includes characteristics (e.g., pH, mixture of elements and/or compounds, temperature) required by the fluid heating system 1420. The fluid treatment facility 1456 may include any equipment necessary to treat the fluid, including but not limited to a mixing vat, a centrifuge, a chemical separator, and a temperature-controlled holding tank.

In one or more embodiments of the invention, the control system 1460 may control the operation of the cooling power generation system 1400. The controller 1462 may be designed to supply power to a cooling system based on specific conditions. For example, the controller 1462 may detect the amount of power needed to run a cooling system is above a set threshold and supply power accordingly. In one or more embodiments, the controller may detect that the power generation system 1400 is capable of generating some or all of the power need to operate the cooling system. In one or more embodiments, the controller may monitor the EM radiation source 1414, and determine the availability of power that can be generated by the power generation system 1400, and supply some or all of the power accordingly.

In one or more embodiments of the invention, the controller may be programmed to supply power from the power generation system 1400 based on specific times of the day. For example, the power generation system 1400 may be programmed to supply power to the cooling system during the peak hours of the use of electricity.

In one or more embodiments of the invention, the control system 1460 may include a transformer 1464. The transformer 1464 may be used to transform the power generated into the specific form of power needed by the cooling system. For example, the power generated by the power generation system 1400 may be transformed into a typical line voltage. As another example, the transformer 1464 may transform the power into a specific voltage needed for the specific cooling system used.

Figure 15:
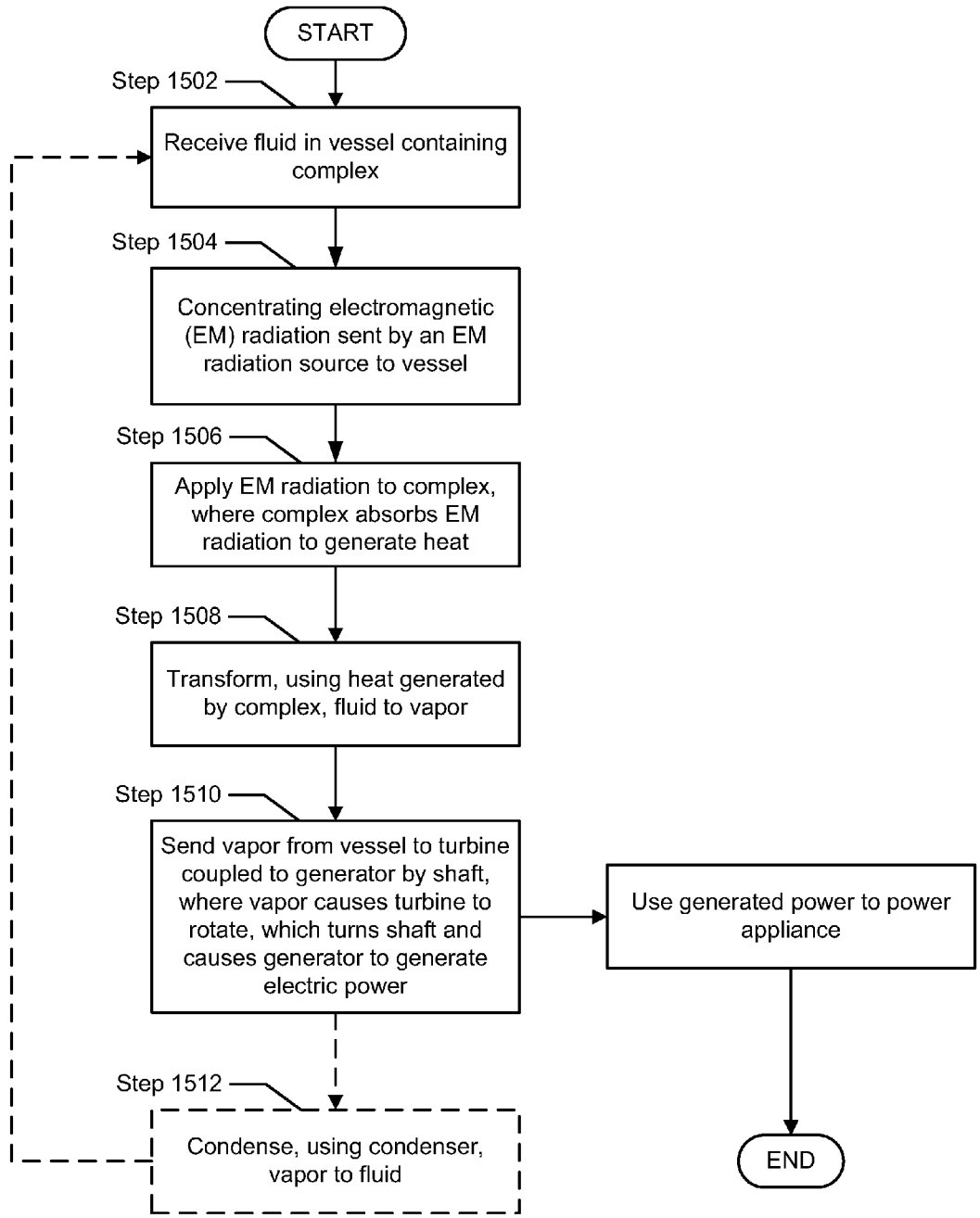
FIG. 15 shows a flowchart for a method of creating vapor for generating electric power in accordance with one or more embodiments of the invention.

FIG. 15 shows a flowchart for a method of creating vapor for generating electricity for a cooling system in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIG. 15, may be included in performing this method. Accordingly, the specific arrangement of steps shown in FIG. 15 should not be construed as limiting the scope of the invention.

Referring to FIG. 15, in Step 1502, a fluid is received in a vessel containing a complex. The fluid may be any liquid, such as water. The fluid may have impurities (e.g., other elements and/or compounds) that are not needed or wanted when the fluid is in vapor form. The vessel may be any container capable of holding a volume of the fluid. For example, the vessel may be a pipe, a chamber, or some other suitable container. In one or more embodiments of the invention, the vessel is adapted to maintain its characteristics (e.g., form, properties) under high temperatures for extended periods of time. The complex may be part of a solution inside the vessel, a coating on the outside of the vessel, a coating on the inside of the vessel, integrated as part of the material of which the vessel is made, integrated with the vessel in some other way, or any suitable combination thereof. The fluid may be received in the vessel using a pump, a valve, a regulator, some other device to control the flow of the fluid, or any suitable combination thereof.

In Step 1504, the EM radiation sent by an EM radiation source to the vessel is concentrated. In one or more embodiments of the invention, the EM radiation is concentrated using an EM radiation concentrator, as described above with respect to FIG. 14. For example, the EM radiation may be concentrated using a lens or a parabolic trough. In one or more embodiments of the invention, the EM radiation is concentrated merely by exposing the vessel to the EM radiation.

In Step 1506, the EM radiation is applied to the complex. In one or more embodiments of the invention, the complex absorbs the EM radiation to generate heat. The EM radiation may be applied to all or a portion of the complex contained in the vessel. The EM radiation may also be applied to an intermediary, which in turn applies the EM radiation (either directly or indirectly, as through convection) to the complex. A control system using, for example, one or more temperature gauges, may regulate the amount of EM radiation applied to the complex, thus controlling the amount of heat generated by the complex at a given point in time. Power required for any component in the control system may be supplied by any of a number of external sources (e.g., a battery, a photovoltaic solar array, alternating current power, direct current power) and/or from electric power generated by the generator, as in Step 1510 below.

In Step 1508, the fluid is transformed into a vapor. In one or more embodiments of the invention, the heat generated by the complex is used to heat the fluid to any temperature at or beyond the boiling point of the fluid. In Step 1510, the vapor is sent from the vessel to a turbine coupled to a generator by a shaft. In one or more embodiments of the invention, the vapor flows through the turbine, causing the turbine blades to turn. As the turbine blades, affixed to the shaft, turn, the generator may also turn. As the generator turns, electric power is produced. The vapor may be sent from the vessel to the turbine using part of a control system, including but not limited to a fan (not shown). The power generated may then be used to power or supplement the power to an appliance, for example, a cooling system.

Optionally, after completing Step 1510, the process proceeds to Step 1512, where the vapor is condensed to a fluid. In one or more embodiments of the invention, a condenser is used to condense the vapor to a fluid. The fluid may be substantially the same fluid as the fluid described above with regard to Step 1502. After completing Step 1512, the process proceeds to Step 1502. Optional Step 1512 is used as part of a recirculation or closed-loop system. Using Step 1512 may increase the energy efficiency for creating steam to generate electric power.

EXAMPLE 1

Closed-Loop System

Figure 16:
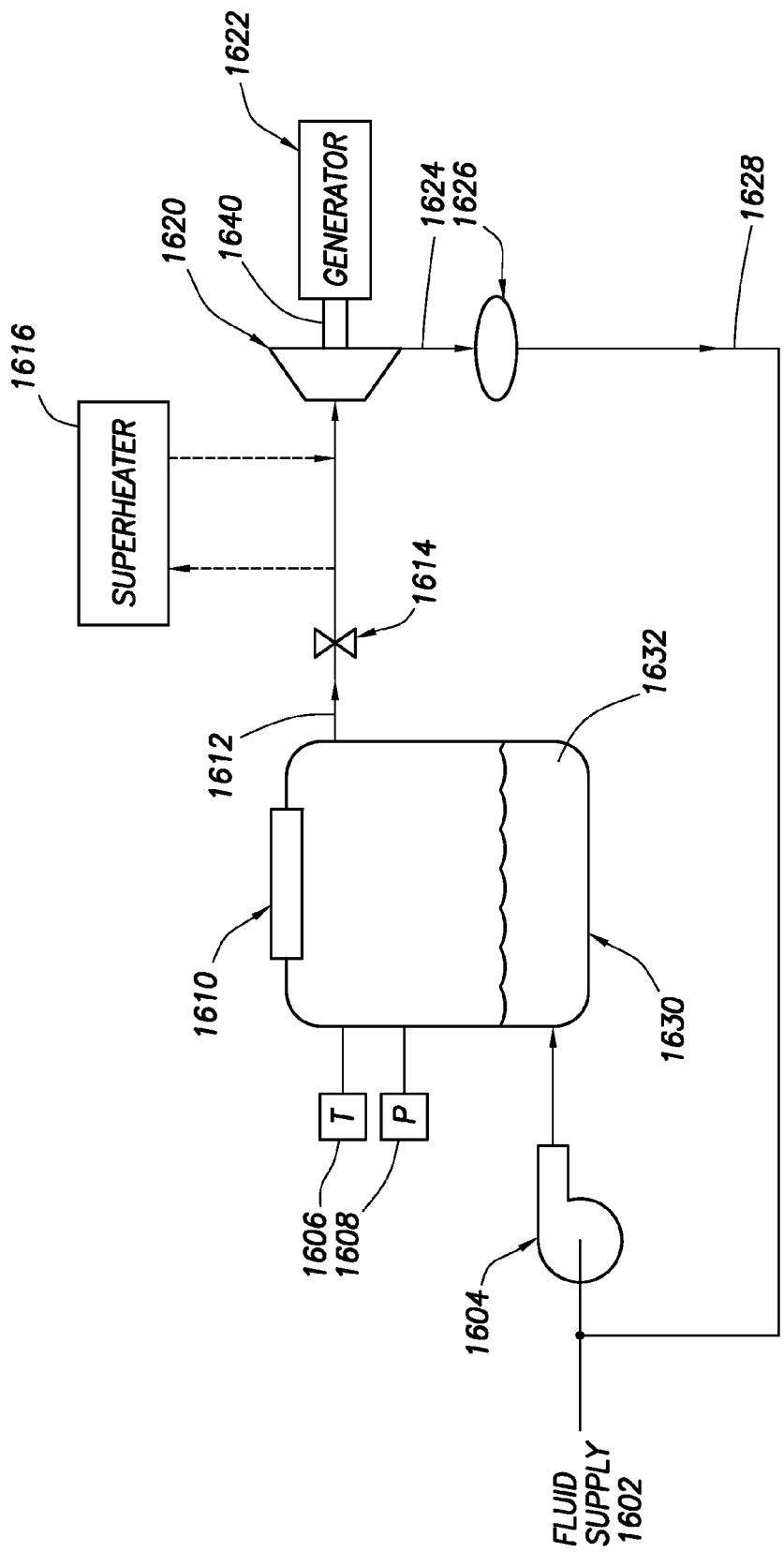
FIG. 16 shows a single line diagram of an example system for creating vapor for generating electric power in accordance with one or more embodiments of the invention.

Consider the following example, shown in FIG. 16, which describes a process that produces steam used to generate electric power for the cooling system in accordance with one or more embodiments described above. Specifically, FIG. 16 illustrates a closed-loop system to produce the steam required to generate electric power. In one or more embodiments, the fluid supply 1602 is a lake or retention pond, where the fluid is water. A pump 1604 is used to move the water from the fluid supply 1602 to the vessel 1630. In this example, the vessel 1630 may be a large tank, a boiler, or some similar container capable of withstanding the temperature, pressure, weight, and other parameters necessary to generate steam.

In this example, the vessel 1630 includes a concentrator 1610 in the form of a large lens integrated as part of the top portion of the vessel 1630. The vessel 1630 also includes a temperature gauge 1606 and a pressure gauge 1608, which may be integrated with a control system (not shown). The water delivered to the vessel 1630 pools at the bottom portion 1632 of the vessel. In this example, the complex is mixed with the water at the bottom portion 1632 of the vessel. An EM radiation source (not shown), such as the sun, provides EM radiation to the concentrator 1610, where the EM radiation is concentrated before entering the vessel 1630. The concentrated EM radiation then contacts the water/complex solution at the bottom portion 1632 of the vessel. As the complex absorbs the EM radiation, heat is generated and transferred to the water in the solution. As the water is heated to a temperature at or above the boiling point of water, the water is transformed into steam and rises toward the top of the vessel 1630.

The steam may leave the vessel 1630 through a pipe 1612. The aforementioned control system may utilize a control valve 1614, a fan, and/or some other device to control the flow of steam from the vessel 1630 to the turbine 1620. Optionally, if the steam is not heated to a sufficiently high temperature, then a superheater 1616 may be used to increase the temperature of the steam to a point that is required to safely operate the turbine 1620. Those skilled in the art will appreciate that the superheater 1616 may be any type of superheater, now known or to be discovered, adapted to increase the temperature of steam.

After the steam enters the turbine 1620, consequently spinning the generator 1622 and creating electric power, the steam travels through a pipe 1624 to a condenser 1626. In the condenser 1626, the steam is condensed from steam to water, where it is returned to the fluid supply 1620 to repeat the process. The water may be drawn from the condenser 1626 to the fluid supply 1620 using a pump 1604.

Figure 17A:
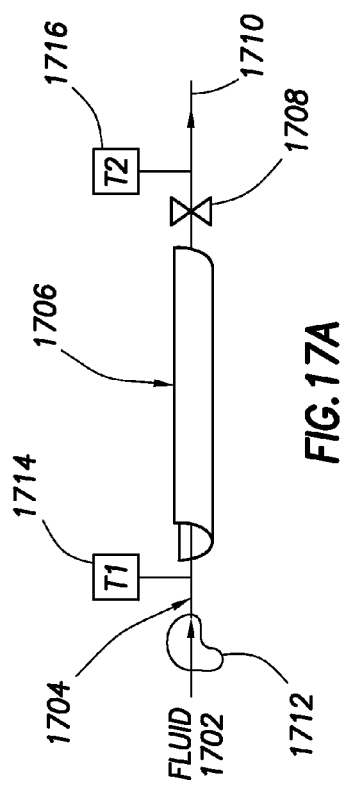
FIGS. 17A and 17B show examples of a vessel including a complex and a fluid in accordance with one or more embodiments of the invention.

As discussed above, the vessel 1630 may take any of a number of forms. Further examples of various vessels are shown in FIGS. 17A through 18B. FIG. 17A, a vessel 1704 in the form of a pipe is shown, along with a portion of a control system. Specifically, FIG. 17A shows the fluid 1702 is sent through the tubular vessel 1704 using a pump 1712. The flow of the fluid 1702 through the vessel 1704 may also be regulated by, for example, a valve 1708. As the fluid reaches the front end of the vessel 1704, a temperature gauge 1714 reads the temperature of the fluid at that point. The vessel in this example is partially surrounded by a parabolic trough 1706, which is made of a reflective material used to direct the EM radiation sent by an EM radiation source (not shown) to the tubular vessel 1704.

Figure 18A:
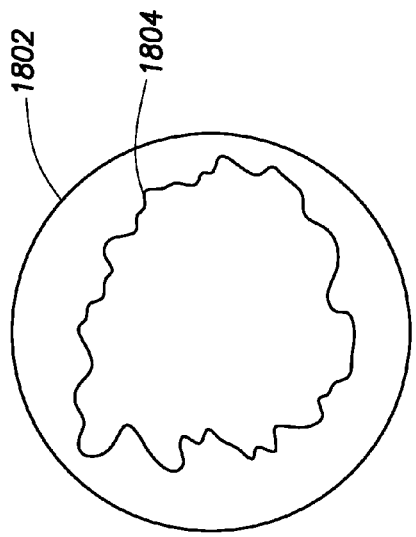
FIGS. 18A and 18B show examples of a vessel containing a complex in accordance with one or more embodiments of the invention.
Figure 18B:
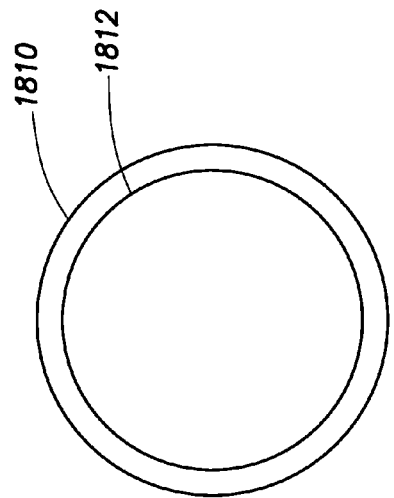
Figure 17B:
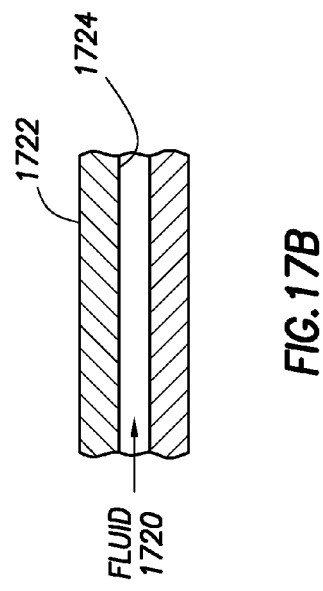

In this example, the vessel 1704 may be a pipe coated with a complex. Specifically, as shown in FIG. 17B, the complex may be coated on the outside of the pipe 1722, and the fluid 1720, which flows inside the vessel, receives the heat generated by the complex at the inner wall of the pipe 1724. Further examples of how the complex may be applied to the vessel are shown in FIGS. 18A and 18B. In FIG. 18A, the complex 1804 is applied to the inside surface 1802 of the vessel. In this case, the complex 1804 is not applied evenly, so that a greater amount of surface area of the complex 1804 comes in direct contact with the fluid as it flows through the vessel. The greater amount of surface area allows for a greater transfer of heat from the complex 1804 to the fluid. Alternatively, in FIG. 18B, the complex 1810 is applied to the outer surface 1812 of the vessel as an even coating. Those skilled in the art will appreciate that integrating the complex with the vessel may occur in any of a number of other ways.

Returning to FIG. 17A, as the fluid 1702 travels through the vessel 1704, the fluid 1702 changes to a vapor 1710. As the vapor 1710 reaches the end of the vessel, a second temperature gauge 1716 may be used to measure the temperature of the steam at that point in time. A control system may regulate the speed of the motor controlling the pump 1712 based on, for example, the length of the vessel 1704, the reading of the first and second temperature gauges 1714, 1716, and a sensor (not shown) to measure the intensity of the EM radiation.

EXAMPLE 2

Waste Heat Recapture System

Figure 19:
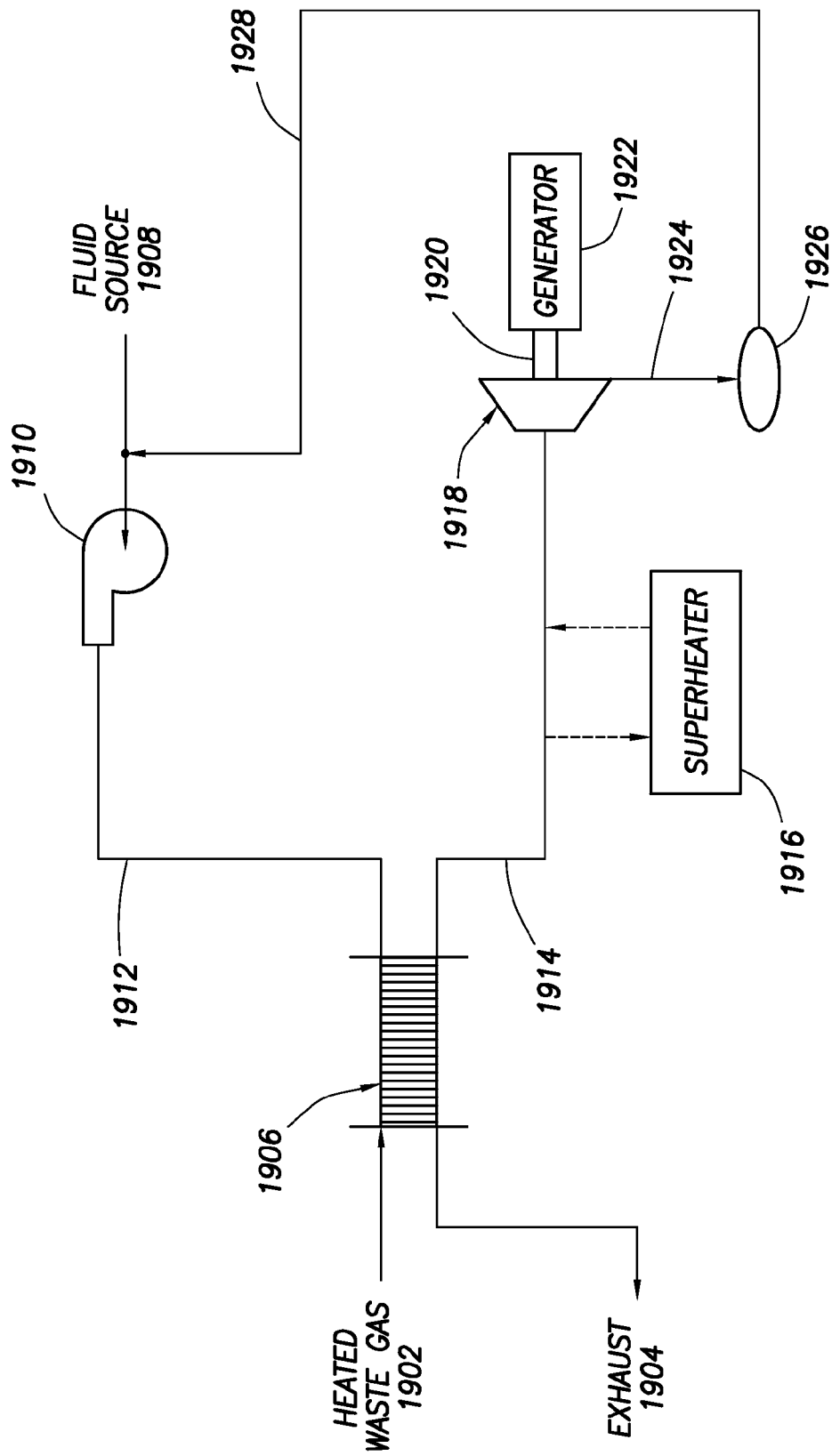
FIG. 19 shows a single line diagram of an example system for creating vapor for generating electric power in accordance with one or more embodiments of the invention.

Consider the following example, shown in FIG. 19, which describes a process that produces steam used to generate electric power in accordance with one or more embodiments described above. Specifically, FIG. 19 illustrates a closed-loop system that utilizes recaptured waste heat to produce the steam required to generate electric power. In one or more embodiments, the fluid source 1908 is a lake or retention pond, where the fluid is water. A pump 1910 is used to send the water from the fluid source 1908 to one end of a heat exchanger 1906.

The heat exchanger 1906 may have two separate chambers that are adjacent to each other and allow the transfer of energy (e.g., heat) from a compound (e.g., gas, liquid) flowing through one of the chambers to a compound flowing through the other chamber. In the heat exchanger 1906, the two compounds are separated by a solid wall so that the two compounds do not mix. For efficiency, the heat exchanger 1906 may be designed to maximize the surface area of the solid wall between the two compounds, while minimizing resistance to the flow of the compounds through both chambers of the heat exchanger 1906. The performance of the heat exchanger 1906 may also be affected by the addition of fins or corrugations on one or both sides of the solid wall separating the chambers. The addition of fins or corrugations on one or both sides of the solid wall may increase surface area and/or channel flow of a compound to induce turbulence. A type of heat exchanger 1906 may be a plate heat exchanger, which is composed of multiple, thin, slightly-separated plates that have very large surface areas and flow passages in both chambers for heat transfer. Those skilled in the art will appreciate that the heat exchanger 1906 may be any other type of heat exchanger, now known or to be discovered, adapted to transfer energy from one chamber to another using two compounds.

In this example, the heat exchanger 1906 is transferring heat from a heated waste gas 1902 to the water sent by the fluid source 1908. A source of the heated waste gas 1902 may include exhaust (e.g., flue gas) from a fossil fuel burned in a boiler or any other industrial process that creates vapor that is merely released or vented into air. The concept of recapturing heated waste gas, whether produced from the same or a different process, is known to those skilled in the art. For example, the heat recover steam generator (HRSG) is commonly used as part of a combined cycle power generation plant, where the HRSG uses flue gas created by a traditional natural gas-fired turbine to generate additional electrical power. In this example, the heated waste gas 1902 becomes exhaust 1904 after the heated waste gas 1902 exits the heat exchanger 1906, although the exhaust 1904 may be treated and/or used for some other purpose in the same or some other process.

Because of the heat transferred from the heated waste gas 1902 to the water in the heat exchanger 1906, the water may be transformed to steam, which traverses through pipe 1914 from the heat exchanger 1906 to the turbine 1918. The rest of the process involving the optional superheater 1916, the turbine 1918, the shaft 1920, the generator 1922, the piping 1924 of the steam to the condenser 1926, the condenser 1926, and the piping 1928 from the condenser 1926 to the fluid source 1908 is substantially similar to the corresponding process involving the same or substantially similar components described above with respect to FIG. 17.

Figure 20:
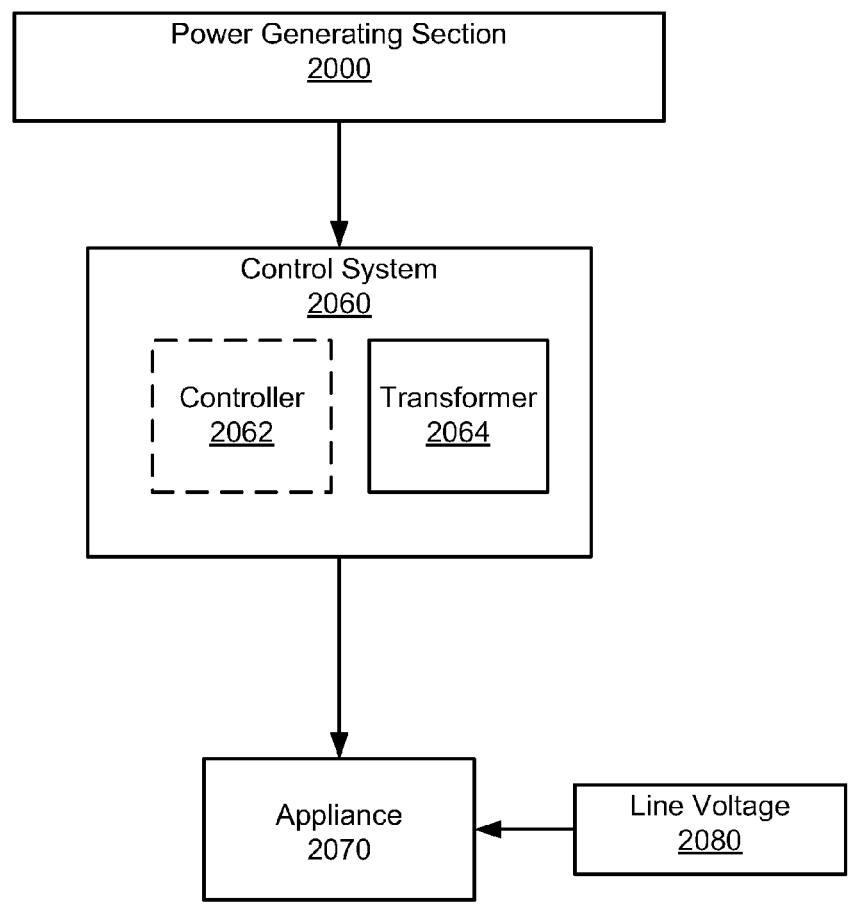
FIG. 20 shows a system in accordance with one or more embodiments of the invention.

FIG. 20 is a system in accordance with one or more embodiments of the invention. The system includes one or more embodiments of the power generating embodiments 2000 described above with the addition of the control system 2060. The control system 2060 may include a controller 2062 and transformer 2064 as described in FIG. 14. The control system 2060 may then be connected to an appliance 2070. The appliance 2070 may or may not be connected to a line voltage 2080. Alternatively, the control system may be connected in series with the appliance 2070 and line voltage 2080, as described above.

In one or more embodiments, the power generating system 2000 and control system 2060 may be incorporated into the appliance 2070. The power generating system 2000 may supply part or all of the power necessary to run the appliance 2070.

One or more embodiments of the invention increase the efficiency of an electric generating system by creating steam using energy from an EM radiation source rather than using heat from burning a source, such as a fossil fuel (e.g., coal, fuel oil, natural gas, wood waste, black liquor). Consequently, embodiments of the invention may reduce or eliminate emissions (e.g., carbon dioxide, sulfur dioxide, mercury) that result from combusting fossil fuels to generate steam.

Further, embodiments of the invention may reduce the cost of building, operating, and maintaining a cooling system In addition, embodiments of the invention may reduce the number of pumps, fans, and other motor-driven equipment that may be required to operate a cooling system. Fuel handling and fuel processing facilities (e.g., coal handling, coal crushing/pulverization, wood chipping/pelletizing) may be reduced or eliminated using embodiments of the invention. Associated maintenance costs of such cooling equipment may also be reduced or eliminated using embodiments of the invention. Further, embodiments of the invention may reduce the amount of chemicals and related equipment required for cooling.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for powering a cooling unit, the method comprising:
applying electromagnetic (EM) radiation to a complex, wherein the complex absorbs the EM radiation to generate heat, wherein the complex is at least one selected from a group consisting of, nanoshells, nanorods, carbon nanostructures, encapsulated nanoshells, encapsulated nanoparticles, and branched nanostructures;
transforming, using the heat generated by the complex, a fluid to vapor; and
sending the vapor from a vessel to a turbine coupled to a generator by a shaft, wherein the vapor causes the turbine to rotate, which turns the shaft and causes the generator to generate the electric power, wherein the electric powers supplements the power needed to power the cooling unit,
wherein the complex further comprises an encapsulating dielectric layer configured to maintain a plasmon resonance of the complex.

2. The method of claim 1, further comprising:
receiving the fluid in the vessel comprising the complex;
concentrating the EM radiation sent by an EM radiation source to the vessel,
wherein the fluid is received in the vessel from a condenser adapted to convert the vapor to the fluid after the vapor flows through the turbine.

3. A system, the system comprising:
a pump configured to extract fluid from a fluid source;
a turbine coupled to a generator by a shaft; and
a vessel comprising a complex, wherein the vessel is configured to:
receive the fluid fed by the pump,
concentrate electromagnetic (EM) radiation received from an EM radiation source,
apply the EM radiation to the complex, wherein the complex absorbs the EM radiation to generate heat,
transform, using the heat generated by the complex, the fluid to vapor, and
send the vapor to the turbine, wherein the vapor rotates the turbine and, using the shaft, causes the generator to generate the electric power, wherein the electric power supplements the power needed to power the cooling unit,
the cooling unit configured to cool a structure, wherein the cooling unit obtains power from the turbine and from one selected from a group consisting of a direct current (DC) power source and an alternating current (AC) power source
wherein the complex is at least one selected from a group consisting of nanoshells, nanorods, carbon nano structures, encapsulated nanoshells, encapsulated nanoparticles, and branched nanostructures,
wherein the complex further comprises an encapsulating dielectric layer configured to maintain a plasmon resonance of the complex.

4. The system of claim 3, wherein the fluid is water.

5. The system of claim 4, wherein the water is untreated.

6. The system of claim 3, wherein the fluid is ethylene glycol.

7. The system of claim 3, wherein the fluid source is a condenser adapted to convert the vapor to the fluid after the vapor flows through the turbine.

8. The system of claim 3, wherein the vessel comprises a concentrator, wherein the concentrator is a lens.

9. The system of claim 3, wherein the vessel comprises a concentrator, wherein the concentrator is a parabolic trough and wherein the vessel is a section of pipe coated with the complex.

10. The system of claim 3, wherein the complex is used in a manner selected from at least one of a group consisting of being coated on an interior of the vessel, being coated on the exterior of the vessel, integrated with material from which the vessel is constructed, integrated into a porous material which is disposed in the vessel, and floating in the fluid in the vessel.

11. The system of claim 3, wherein the vessel further comprises a control system comprising:
a pressure sensor configured to measure a pressure inside the vessel; and
a valve that opens to release the vapor from the vessel when the pressure read by the pressure sensor is above a pressure threshold.

12. The system of claim 11, wherein the control system of the vessel further comprises:
a temperature sensor configured to measure a temperature inside the vessel, wherein the valve opens to release the vapor from the vessel when the temperature read by the temperature sensor is above a temperature threshold.

13. The system of claim 3, wherein the vessel is operatively connected to a photocell and wherein power from the turbine is provided to the cooling unit based on a reading of the photocell.

14. The system of claim 1, wherein the vessel has a thermal efficiency of steam formation of at least 80%.

15. The system of claim 3, wherein the vessel has a thermal efficiency of steam formation of at least 80%.

* * * * *